US012766911B2

(12) United States Patent
Maeda et al.

(10) Patent No.: US 12,766,911 B2
(45) Date of Patent: Oct. 20, 2026

(54) VEHICLE SEAT AIR CONDITIONING DEVICE

(71) Applicant: Panasonic Automotive Systems Co., Ltd., Kanagawa (JP)

(72) Inventors: Yoshihiko Maeda, Hyogo (JP); Yuki Makita, Kanagawa (JP); Takuya Nakagawa, Shiga (JP); Tatehiko Inoue, Osaka (JP); Takeshi Enya, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 215 days.

(21) Appl. No.: 18/820,987

(22) Filed: Aug. 30, 2024

(65) Prior Publication Data

US 2024/0416715 A1 Dec. 19, 2024

Related U.S. Application Data

(63) Continuation of application No. PCT/JP2023/004858, filed on Feb. 13, 2023.

(30) Foreign Application Priority Data

Mar. 2, 2022 (JP) ................................. 2022-031508
Sep. 29, 2022 (JP) ................................. 2022-156381

(51) Int. Cl.
*B60H 1/00* (2006.01)
*B60N 2/56* (2006.01)

(52) U.S. Cl.
CPC ..... *B60H 1/00457* (2013.01); *B60H 1/00285* (2013.01); *B60H 1/00828* (2013.01); *B60N 2/565* (2013.01); *B60N 2/5657* (2013.01)

(58) Field of Classification Search
CPC .............. B60H 1/00285; B60N 2/5621; B60N 2/5635; B60N 2/5642; B60N 2/565; B60N 2/5657
See application file for complete search history.

(56) References Cited

U.S. PATENT DOCUMENTS 6,079,485 A * 6/2000 Esaki ................. B60H 1/00735 219/202
7,647,780 B2 * 1/2010 Aoki ...................... B60N 2/565 62/3.61

(Continued)

FOREIGN PATENT DOCUMENTS

JP 2020189510 A 11/2020

OTHER PUBLICATIONS

International Search Report, dated May 9, 2023, International Patent Application No. PCT/JP2023/004858. (8 pages) (with English Translation).

*Primary Examiner* — Philip F Gabler
(74) *Attorney, Agent, or Firm* — Seed Intellectual Property Law Group LLP

(57) ABSTRACT

A vehicle seat air conditioning device includes: a regulator that adjusts a ratio between a flow rate of air directed from a first ventilation path to a third ventilation path and a flow rate of air directed from a second ventilation path to the third ventilation path by adjusting the degree of opening of each of a first connection port, which connects the first ventilation path to the third ventilation path, and a second connection port, which connects the second ventilation path to the third ventilation path; and a controller that adjusts the ratio by causing the regulator to adjust the degree of opening, based on a first temperature indicating a temperature in the first ventilation path, a second temperature indicating a temperature in the second ventilation path, and a third temperature indicating a temperature in the third ventilation path.

18 Claims, 9 Drawing Sheets

(56) References Cited

U.S. PATENT DOCUMENTS

| | | | | |
|---|---|---|---|---|
| 10,569,616 | B2 * | 2/2020 | Tanaka | B60H 1/00285 |
| 10,773,615 | B2 * | 9/2020 | McElroy | B60H 1/00285 |
| 11,964,540 | B2 * | 4/2024 | Tsukagishi | B60H 1/00807 |
| 12,280,631 | B2 * | 4/2025 | Makita | A47C 7/74 |
| 12,539,797 | B2 * | 2/2026 | Maeda | B60N 2/565 |
| 2018/0117987 | A1 * | 5/2018 | Yamaoka | B60N 2/5657 |
| 2018/0272835 | A1 * | 9/2018 | Fujii | B60H 1/00285 |
| 2019/0054793 | A1 * | 2/2019 | Fujii | B60H 1/0055 |
| 2019/0241043 | A1 * | 8/2019 | Ito | B60N 2/5657 |
| 2019/0351742 | A1 * | 11/2019 | Fujii | B60N 2/5635 |
| 2020/0093635 | A1 * | 3/2020 | Kakizaki | B60N 2/5671 |
| 2023/0302871 | A1 * | 9/2023 | Makita | B60N 2/5657 |
| 2024/0286453 | A1 * | 8/2024 | Nakagawa | B60N 2/5657 |
| 2024/0416715 | A1 * | 12/2024 | Maeda | B60H 1/00457 |
| 2024/0424861 | A1 * | 12/2024 | Nakagawa | B60H 1/00564 |

* cited by examiner

VEHICLE SEAT AIR CONDITIONING DEVICE

CROSS REFERENCE TO RELATED APPLICATIONS

This is a continuation application of PCT International Application No. PCT/JP2023/004858 filed on Feb. 13, 2023, designating the United States of America, which is based on and claims priority of Japanese Patent Application No. 2022-031508 filed on Mar. 2, 2022, and Japanese Patent Application No. 2022-156381 filed on Sep. 29, 2022.

FIELD

The present disclosure relates to a vehicle seat air conditioning device that blows air to a person seated on a seat.

BACKGROUND

Background

In recent years, there has been a demand to provide a comfortable air-conditioned environment for a person seated on a seat (chair) in a vehicle or the like (for example, see Patent Literature (PTL) 1).

PTL 1 discloses a pressure sensor disposed in a seat and a device that controls air conditioning to the seat by imaging the state of a person seated on the seat and detecting the physique and posture of the person.

CITATION LIST

Patent Literature

PTL 1: Japanese Unexamined Patent Application Publication No. 2020-189510

SUMMARY

However, the device according to PTL 1 can be improved upon.

In view of this, the present disclosure provides a vehicle seat air conditioning device capable of improving upon the above related art.

A vehicle seat air conditioning device according to one aspect of the present disclosure is a vehicle seat air conditioning device disposed in a vehicle and used for a seat including a seat back and a seat cushion, the vehicle seat air conditioning device including: a blower embedded in the seat; a first ventilation path through which air drawn in by the blower passes from a first air inlet provided on a surface of the seat that is located on a face of the seat on which a person is seated; a second ventilation path through which air drawn in by the blower passes from a second air inlet that is an air inlet different from the first air inlet and provided at a location in the seat other than the surface of the seat; a third ventilation path through which air directed from at least one of the first ventilation path or the second ventilation path is directed to an air outlet provided on a surface of the seat back that is a surface located on the face of the seat on which the person is seated; a regulator that adjusts a ratio between a flow rate of air directed from the first ventilation path to the third ventilation path and a flow rate of air directed from the second ventilation path to the third ventilation path by adjusting a degree of opening of each of a first connection port and a second connection port, the first connection port connecting the first ventilation path and the third ventilation path, the second connection port connecting the second ventilation path and the third ventilation path; and a controller that controls the blower and the regulator. The controller adjusts the ratio by causing the regulator to adjust the degree of opening, based on a first temperature that is a temperature in the first ventilation path, a second temperature that is a temperature in the second ventilation path, and a third temperature that is a temperature in the third ventilation path.

The vehicle seat air conditioning device according to one aspect of the present disclosure can be improved upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
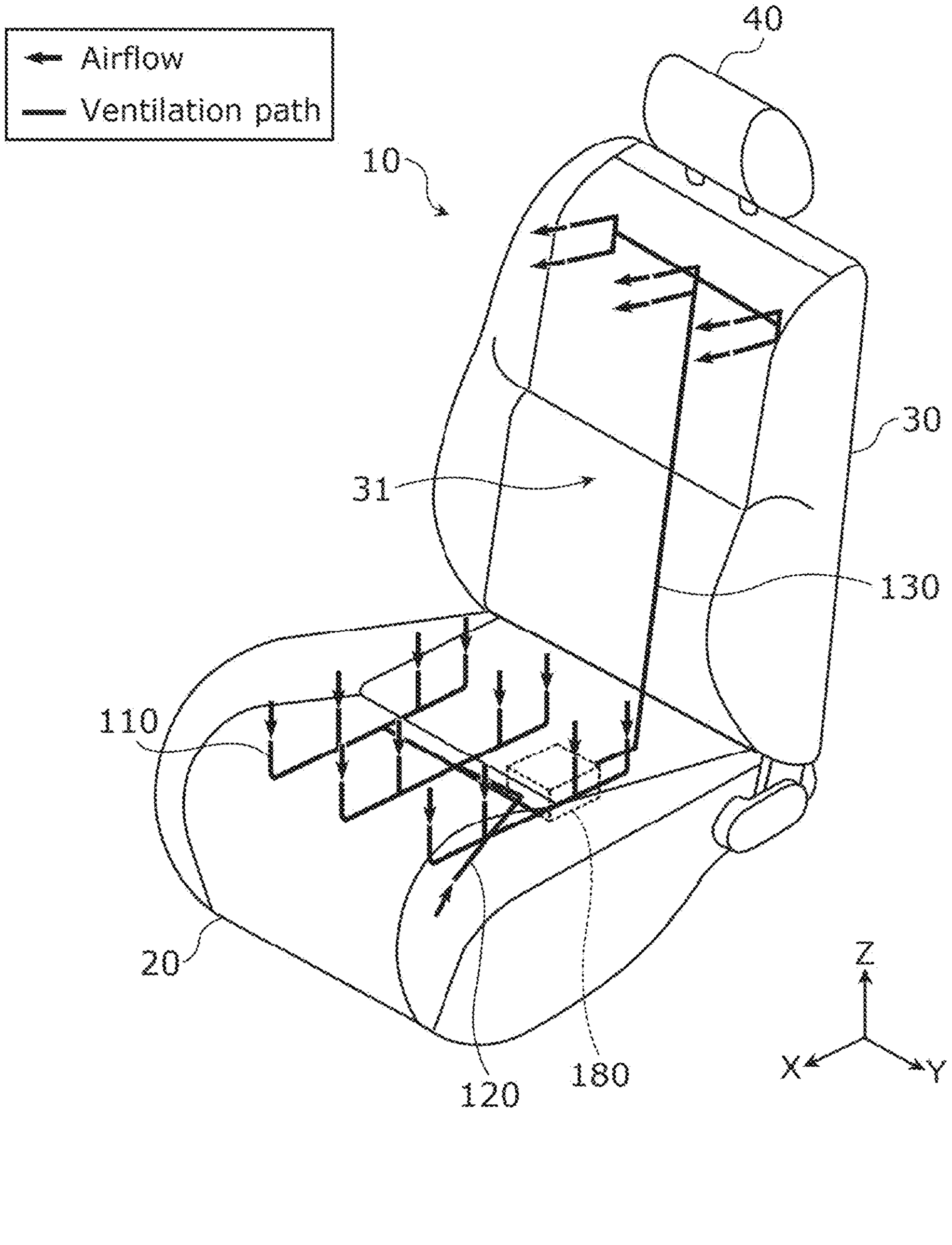
FIG. 1 is an external perspective view illustrating a seat according to an embodiment.

DESCRIPTION OF EMBODIMENT (Outline of Present Disclosure)

A vehicle seat air conditioning device according to one aspect of the present disclosure is a vehicle seat air conditioning device disposed in a vehicle and used for a seat including a seat back and a seat cushion, the vehicle seat air conditioning device including: a blower embedded in the seat; a first ventilation path through which air drawn in by the blower passes from a first air inlet provided on a surface of the seat that is located on a face of the seat on which a person is seated; a second ventilation path through which air drawn in by the blower passes from a second air inlet that is an air inlet different from the first air inlet and provided at a location in the seat other than the surface of the seat; a third ventilation path through which air directed from at least one of the first ventilation path or the second ventilation path is directed to an air outlet provided on a surface of the seat back that is a surface located on the face of the seat on which the person is seated; a regulator that adjusts a ratio between a flow rate of air directed from the first ventilation path to the third ventilation path and a flow rate of air directed from the second ventilation path to the third ventilation path by adjusting a degree of opening of each of a first connection port and a second connection port, the first connection port connecting the first ventilation path and the third ventilation path, the second connection port connecting the second ventilation path and the third ventilation path; and a controller that controls the blower and the regulator. The controller adjusts the ratio by causing the regulator to adjust the degree of opening, based on a first temperature that is a temperature in the first ventilation path, a second temperature that is a temperature in the second ventilation path, and a third temperature that is a temperature in the third ventilation path.

Conventionally, devices such as pressure sensors and cameras used to detect the physique and posture of a person seated on a seat have been expensive. Therefore, there has been a need for a device that can provide a comfortable air conditioning environment for a person seated on a seat while suppressing a cost increase.

In the vehicle seat air conditioning device according to one aspect of the present disclosure, the controller causes the regulator based on the temperatures in the first ventilation path, the second ventilation path, and the third ventilation path to adjust the temperature of air blown toward the person seated on the seat. Therefore, it is possible to provide a comfortable air conditioning environment for a person seated on the seat while suppressing a cost increase.

Further, for example, the controller adjusts the ratio based on x calculated according to: $x=(c-b)/(a-b)$ (Equation 1), where a is the first temperature, b is the second temperature, and c is the third temperature.

With this configuration, the controller can appropriately adjust the ratio so that the person seated on the seat feels comfortable by using the temperatures in the first ventilation path, the second ventilation path, and the third ventilation path.

Further, for example, when an absolute value of a difference between x and a target value is greater than or equal to a first threshold, the controller adjusts, based on temperature relationship information, the degree of opening to change by a first variation to cause x to become the target value, the temperature relationship information indicating a correlation between x and the degree of opening.

With this configuration, when the temperature of the air blown toward the person seated on the seat differs from the temperature assumed to be comfortable by the person seated on the seat, the controller can appropriately adjust the ratio so that the person seated on the seat feels comfortable.

Further, for example, in a case where the absolute value is less than the first threshold, when the absolute value is greater than or equal to a second threshold, the controller causes, based on the temperature relationship information, the regulator to change the degree of opening by a second variation to cause x to become the target value, the second variation being smaller than the first variation, and when the absolute value is less than the second threshold, the controller causes the regulator not to change the degree of opening.

With this configuration, the controller can appropriately adjust the variation between before and after the change in the temperature of the air blown toward the person seated on the seat in accordance with the difference between the temperature of the air blown toward the person seated on the seat and the temperature assumed to be comfortable by the person seated on the seat.

Further, for example, the controller obtains a detection result of a human presence sensor configured to detect whether the person is seated on the seat, the controller determines whether the person is seated on the seat based on x, and when the detection result and a determination result of whether the person is seated on the seat based on x do not match, the controller outputs information indicating that the detection result and the determination result do not match.

When the determination result and the detection result differ, it is assumed that a failure has occurred, such as the blocking of the first air inlet with dust or the like instead of a person. With this configuration, the occurrence of such a failure can be reported to a person.

Further, for example, the controller determines whether the person is seated on the seat based on x, when determining that the person is seated on the seat, the controller adjusts a rotational frequency of the blower to become a predetermined rotational frequency, and when determining that the person is not seated on the seat, the controller adjusts the rotational frequency of the blower to become a rotational frequency less than the predetermined rotational frequency.

With this configuration, the rotational frequency of the blower can be reduced when the person is not seated on the seat, thereby preventing unnecessary operation of the blower.

Further, for example, when x is greater than or equal to a third threshold, the controller determines that the person is not seated on the seat, and when x is less than the third threshold, the controller determines that the person is seated on the seat.

With this configuration, the controller can appropriately determine whether the person is seated on the seat using x.

Further, for example, the controller causes the blower based on the first temperature, the second temperature, and the third temperature to adjust a rotational frequency of the blower.

With this configuration, the controller causes the blower based on the temperatures in the first ventilation path, the second ventilation path, and the third ventilation path to adjust the flow rate of air blown toward the person seated on the seat. Therefore, it is possible to provide a more comfortable air conditioning environment for a person seated on the seat while suppressing a cost increase.

Further, for example, the controller adjusts a rotational frequency of the blower based on output relationship information indicating a correlation between the rotational frequency of the blower and the degree of opening.

With this configuration, it is possible to appropriately adjust the rotational frequency of the blower.

Further, for example, a third temperature sensor that detects the third temperature is provided in the third ventilation path.

With this configuration, the third temperature can be set appropriately.

Further, for example, a first temperature sensor that detects the first temperature is provided in the first ventilation path.

With this configuration, the first temperature can be set appropriately.

Further, for example, the controller uses, as the first temperature, a temperature detected by a cabin temperature sensor that is disposed in a cabin of the vehicle and detects a temperature in the cabin.

With this configuration, for example, when the cabin temperature sensor is provided in advance in the vehicle, the third temperature can be appropriately set without providing a separate temperature sensor.

Further, for example, a second temperature sensor that detects the second temperature is provided in the second ventilation path.

With this configuration, the second temperature can be set appropriately.

Further, for example, the controller uses, as the second temperature, air conditioning temperature information indicating a temperature of air blown out by vehicle air conditioning equipment disposed in the vehicle.

With this configuration, for example, when the vehicle air conditioning equipment with its temperature settable by a user is provided in advance in the vehicle, the second temperature can be set appropriately without providing a separate temperature sensor by setting, as the second temperature, the temperature set by the user or the temperature obtained from a temperature sensor or the like that is provided in the vehicle air conditioning equipment.

Further, for example, the controller corrects the temperature relationship information based on the first temperature, the second temperature, and the third temperature in a state where the person is not seated on the seat or in a state where a predetermined person is seated on the seat.

For example, x becomes a specific value under the same environment, such as a state where the person is not seated on the seat, and under the same conditions of the degree of opening and the rotational frequency of the blower. Here, when a part of the first air inlet is blocked by clogging or the like in the seat, x becomes a value different from the specific value even under the same conditions of the degree of opening and the rotational frequency of the blower. Therefore, x is calculated using the first temperature, the second temperature, and the third temperature in a state where the person is not seated on the seat or a predetermined person is seated on the seat, and the temperature relationship information is corrected based on the calculation result. With this configuration, even if the state of the seat is changed due to a part of the first air inlet being blocked by clogging or the like in the seat, air at an appropriate temperature can be blown out from the air outlet. Therefore, even if the state of the seat is changed, a comfortable air conditioning environment can be provided to the person seated on the seat.

Further, for example, the controller corrects the output relationship information based on the first temperature, the second temperature, and the third temperature in a state where the person is not seated on the seat or in a state where a predetermined person is seated on the seat.

With this configuration, even if the state of the seat is changed due to a part of the first air inlet being blocked by clogging or the like in the seat, an appropriate flow rate of air can be blown out from the air outlet. Therefore, even if the state of the seat is changed, a comfortable air conditioning environment can be provided to the person seated on the seat.

Further, for example, the controller calculates x based on the first temperature, the second temperature, and the third temperature in a state where the person is not seated on the seat, and when x calculated is less than or equal to a fourth threshold that is lower than the third threshold, the controller causes notification equipment to notify information indicating that the seat is clogged.

With this configuration, the wider the range of the first air inlet blocked by clogging or the like in the seat, the smaller x becomes. Therefore, for example, when the calculated x is lower than the fourth threshold, the information indicating that the seat is clogged is notified to the driver of the vehicle. This prevents the rotational frequency of the blower from increasing due to a correction made for the blockage of the first air inlet, and also prevents problems such as increased power consumption and noise caused by the increased rotational frequency of the blower.

For example, the controller calculates x based on the first temperature, the second temperature, and the third temperature in a state where the person is not seated on the seat, and when x calculated differs from the third threshold, the controller changes the third threshold to x calculated.

With this configuration, even if a part of the first air inlet is blocked by clogging or the like in the seat, the third threshold is changed to an appropriate value.

Note that these general and specific aspects may be implemented using a system, a method, an integrated circuit, a computer program, or a non-transitory computer-readable recording medium such as a compact disc read-only memory (CD-ROM), or any combination of systems, methods, integrated circuits, computer programs, or non-transitory computer-readable recording media.

Hereinafter, an exemplary embodiment will be described below with reference to the drawings.

Note that an embodiment described below shows a general or specific example. The numerical values, shapes, materials, components, arrangement positions and connection forms of the components, steps, the order of the steps, and the like shown in the following embodiment are examples and are not intended to limit the present disclosure. Among the components in the following embodiment, components that are not recited in the independent claims will be described as optional components.

Each of the drawings is a schematic view and is not necessarily a strict illustration. In the drawings, the same components are denoted by the same reference numerals.

In the following description, the longitudinal direction of the seat is referred to as the X-axis direction, and the vertical direction of the seat is referred to as the Z-axis direction. Moreover, the lateral direction of the seat, that is, the direction perpendicular to the X-axis direction and the Z-axis direction, is referred to as the Y-axis direction. The front side of the seat in the X-axis direction is referred to as the positive side, and the rear side of the seat is referred to as the negative side. The left side as viewed from a person seated on the seat is referred to as the positive Y-axis side, and the opposite side is referred to as the negative Y-axis side. Specifically, when a person is seated on the seat, the right direction is the right direction of the person with respect to the direction of travel of the vehicle and is the negative Y-axis direction. When a person is seated on the seat, the left side is the left direction of the person with respect to the direction of travel of the vehicle and is the positive Y-axis direction. The upper side of the seat in the Z-axis direction is referred to as the positive side, and the lower side of the seat is referred to as the negative side.

Expressions such as "greater than or equal to" and "less than" in the following description are used in the sense of comparisons based on thresholds or the like, and may be replaced with "greater than", "less than or equal to", and other expressions.

EMBODIMENT

[Configuration]

Figure 2:
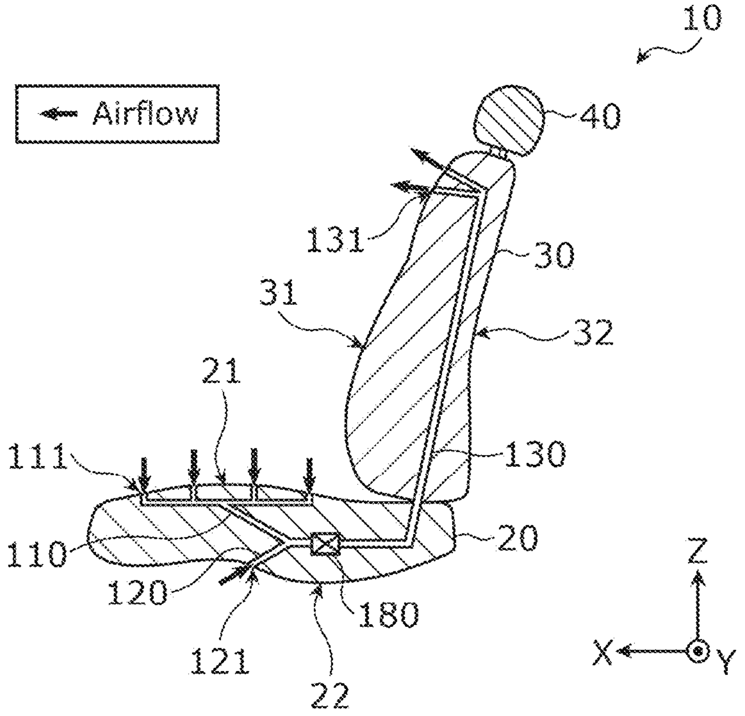
FIG. 2 is a view for explaining the internal configuration of the seat according to the embodiment.
Figure 3:
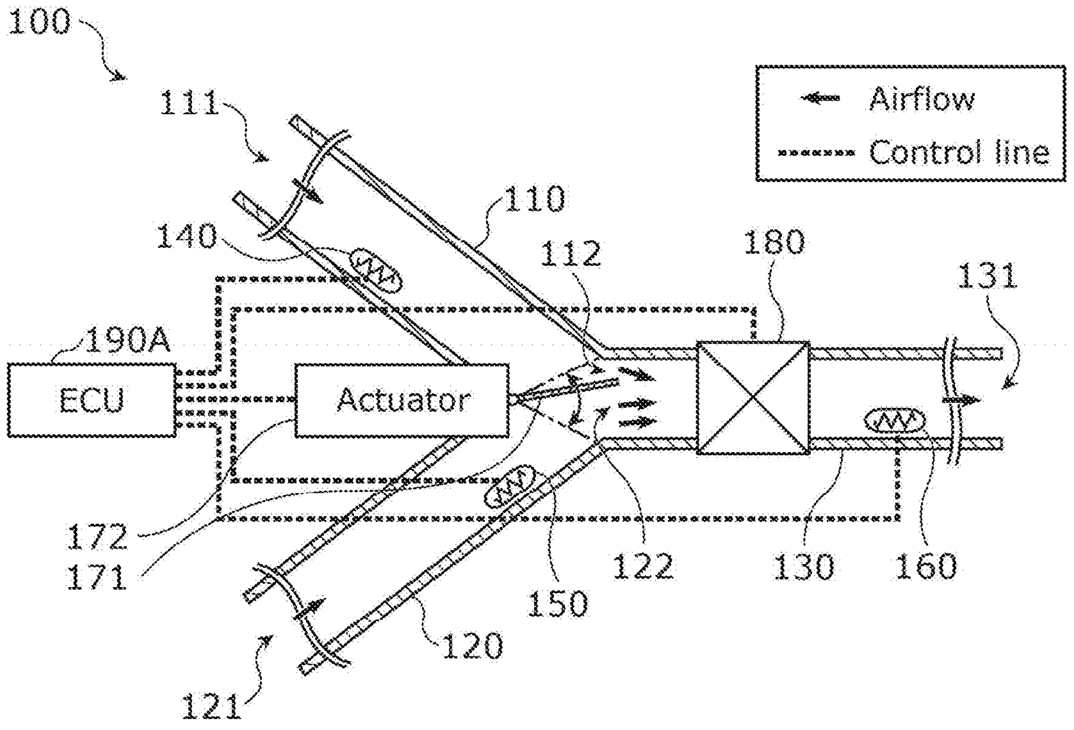
FIG. 3 is a view schematically illustrating a specific example of a hardware configuration of a vehicle seat air conditioning device according to the embodiment.

FIG. 1 is an external perspective view illustrating seat 10 according to an embodiment. FIG. 2 is a view for explaining the internal configuration of seat 10 according to the embodiment. Specifically, FIG. 2 is a sectional view schematically illustrating a cross section of seat 10. FIG. 3 is a view schematically illustrating a specific example of the hardware configuration of vehicle seat air conditioning device 100 according to the embodiment.

In FIG. 1, FIG. 2, and FIG. 3, airflow is indicated by thick arrows. In FIG. 1, ventilation paths, such as first ventilation path 110, second ventilation path 120, and third ventilation path 130, are indicated by bold lines. In FIG. 3, control lines connecting electronic control unit (ECU) 190A and respective devices, such as actuator 172, are indicated by dashed lines. In FIGS. 1 and 2, some of the components of vehicle seat air conditioning device 100, such as ECU 190A and actuator 172, are omitted.

Vehicle seat air conditioning device 100 is an air conditioning device that blows air toward a person seated on seat 10 (specifically, seat cushion 20). For example, vehicle seat air conditioning device 100 is disposed inside seat 10, which is disposed in a vehicle such as an automobile. Device 100 generates airflow by drawing in air from first air inlet 111, provided at a location corresponding to the buttocks and thighs of the person seated on seat 10, and blows the air from air outlet 131 provided in seat 10 toward the upper body, such as the head, neck, acromion, back, and waist, of the person seated on seat 10.

Thus, vehicle seat air conditioning device 100 can reduce moisture between the buttocks and thighs and seat 10 by, for example, drawing in air from the location corresponding to the buttocks and thighs of the person seated on seat 10. Further, vehicle seat air conditioning device 100 can cool or warm the person seated on seat 10 by, for example, blowing air toward the person seated on seat 10.

Seat 10 is a chair in which vehicle seat air conditioning device 100 is disposed and on which a person sits. That is, vehicle seat air conditioning device 100 is disposed in a vehicle where seat 10 is disposed. Seat 10 includes seat cushion 20, seat back 30, and headrest 40.

Seat cushion 20 is a seat on which a person sits. Seat cushion 20 includes seat surface 21, and a person sits on seat surface 21. In the present embodiment, first air inlet 111 is provided on seat surface 21. In the present embodiment, second air inlet 121 is provided on lower surface 22 of seat cushion 20, which is the surface opposite to seat surface 21.

Although not illustrated, in the present embodiment, a flow path, such as a pipe, through which air blown out from vehicle air conditioning equipment 230 (see FIG. 4) flows, is connected to second air inlet 121. Vehicle air conditioning equipment 230 is air conditioning equipment included in the vehicle where seat 10 is disposed. Thus, air blown out from vehicle air conditioning equipment 230 flows into second air inlet 121.

Seat back 30 is a backrest portion (back surface portion) against which a person seated on seat 10 leans his or her back. Seat back 30 includes front surface 31. A person seated on seat 10 leans back to bring his or her back into contact with front surface 31 Seat back 30 is long in the Z-axis direction and is disposed to rise up against seat cushion 20. In the present embodiment, air outlet 131 is provided on front surface 31.

Vehicle seat air conditioning device 100 mixes air drawn in from first air inlet 111 and air drawn in from second air inlet 121, and blows out (in other words, discharges) the mixed air from air outlet 131. For example, by drawing in cool air with a temperature lower than the air inside the vehicle from second air inlet 121, cool air can be blown out from air outlet 131, that is, cooling of the vehicle interior can be performed. Alternatively, by drawing in warm air with a temperature higher than that of the air inside the vehicle from second air inlet 121, warm air can be blown out from air outlet 131, that is, heating of the vehicle interior can be performed.

Headrest 40 is a headrest portion that supports the head of a person seated on seat 10. Headrest 40 is fixed to the end of seat back 30 on the positive Z-axis side.

For example, the configuration of vehicle seat air conditioning device 100 illustrated in FIG. 3 is disposed inside seat 10.

As illustrated in FIG. 3, for example, first temperature sensor 140 is disposed in first ventilation path 110, second temperature sensor 150 is disposed in second ventilation path 120, and third temperature sensor 160 is disposed in third ventilation path 130. First ventilation path 110 and third ventilation path 130 are connected so that air can move through first connection port 112, and second ventilation path 120 and third ventilation path 130 are connected so that air can move through second connection port 122. ECU 190A is a computer (electronic control unit) that controls actuator 172 based on temperatures detected respectively by first temperature sensor 140, second temperature sensor 150, and third temperature sensor 160. Specifically, ECU 190A causes actuator 172 for adjusting the position and/or orientation (angle) of door 171 to adjust the degree of opening of each of first connection port 112 and second connection port 122 (hereinafter also referred to simply as the degree of door opening). Thus, ECU 190A adjusts the flow rate of air flowing from first ventilation path 110 to third ventilation path 130 and the flow rate of air flowing from second ventilation path 120 to third ventilation path 130. Moreover, ECU 190A controls the flow rate of air blown out from air outlet 131 by controlling blower 180 provided in third ventilation path 130. In the present embodiment, when the degree of opening of one of first connection port 112 or second connection port 122 increases (that is, the opening becomes wider), the degree of opening of the other decreases (that is, the opening becomes narrower).

Figure 4:
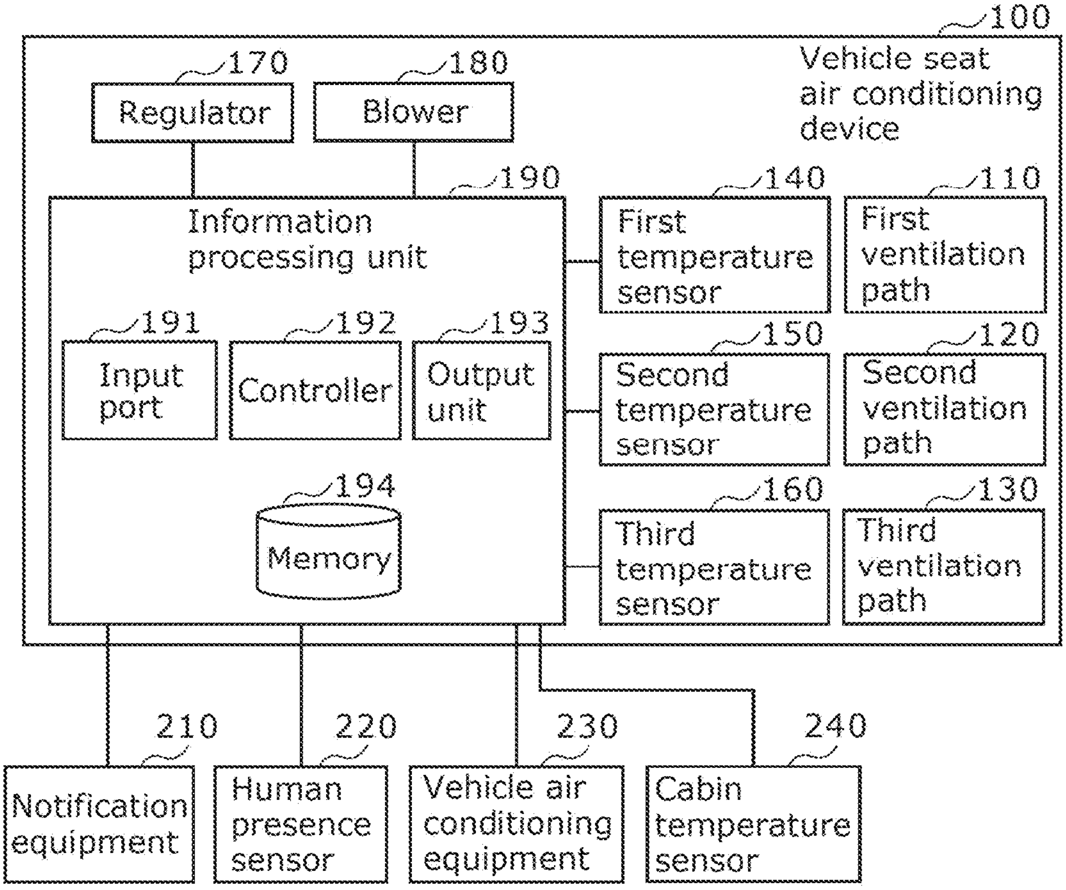
FIG. 4 is a block diagram illustrating the configuration of the vehicle seat air conditioning device according to the embodiment.

FIG. 4 is a block diagram illustrating the configuration of vehicle seat air conditioning device 100 according to the embodiment.

As described above, vehicle seat air conditioning device 100 is an air conditioning device disposed in the vehicle and used for seat 10 including seat back 30 and seat cushion 20. Vehicle seat air conditioning device 100 draws in air circulated around seat 10 and blows the drawn air toward the person from behind to perform air blowing.

Vehicle seat air conditioning device 100 includes first ventilation path 110, second ventilation path 120, third ventilation path 130, first temperature sensor 140, second temperature sensor 150, third temperature sensor 160, regulator 170, blower 180, and information processing unit 190.

In seat 10, first ventilation path 110 is a flow path through which air drawn in by blower 180 passes from first air inlet 111 provided on the surface of seat 10 that is the surface located on the face of seat 10 on which the person is seated. First ventilation path 110 is embedded in seat 10 (in the present embodiment, seat cushion 20).

Note that the surface of seat 10 is, for example, a surface including seat surface 21 and front surface 31. In the present embodiment, the surface on which first air inlet 111 is provided is seat surface 21, but may be front surface 31 or the like.

First air inlet 111 is an opening provided on the surface of seat 10 and connected to first ventilation path 110 to allow air movement. First air inlet 111 opens toward, for example, the interior of a cabin (ventilation), and draws air from the cabin. First air inlet 111 is provided on the surface of seat 10 facing the person seated on seat 10. In the present embodiment, a plurality of first air inlets 111 are provided on seat surface 21.

Air drawn in through first air inlet 111 and passing through first ventilation path 110 flows through first connection port 112 to third ventilation path 130.

Second ventilation path 120 is a flow path through which air drawn in by blower 180 passes from second air inlet 121, an air inlet different from first air inlet 111 and provided at a location in seat 10 other than the surface of seat 10, that is, the surface of seat 10 other than seat surface 21 and front surface 31. Second ventilation path 120 is a ventilation path different from first ventilation path 110, and is embedded in seat 10 (in the present embodiment, seat cushion 20).

Note that the location other than the surface of seat 10 is, for example, a surface including lower surface 22 and rear surface 32. In the present embodiment, the surface on which second air inlet 121 is provided is lower surface 22, but may be rear surface 32 or the like.

As described above, a flow path, such as a pipe, through which air blown out from vehicle air conditioning equipment 230 flows, is connected to second air inlet 121. Vehicle air conditioning equipment 230 is air conditioning equipment included in the vehicle where seat 10 is disposed. For example, second air inlet 121 is provided on the surface not facing the person seated on seat 10.

Note that second air inlet 121 may open toward the interior of the cabin in the same manner as first air inlet 111.

Third ventilation path 130 is a flow path that directs air, from at least one of first ventilation path 110 or second ventilation path 120, to air outlet 131 provided on the surface (in the present embodiment, front surface 31) of seat back 30 that is the surface located on the face of seat 10 on which the person is seated. Third ventilation path 130 is a ventilation path different from first ventilation path 110 and second ventilation path 120, and is embedded in seat 10. In the present embodiment, a part of third ventilation path 130 is disposed inside seat 10, and the other part of third ventilation path 130 is disposed inside seat back 30.

Air outlet 131 is an opening provided on front surface 31 and connected to third ventilation path 130 to allow air movement. That is, air outlet 131 opens toward the interior of the cabin. In the present embodiment, a plurality of air outlets 131 are provided on front surface 31. For example, air outlet 131 is provided on the upper side of front surface 31.

Note that air outlet 131 may be provided on headrest 40. That is, a part of third ventilation path 130 may be provided in headrest 40.

First ventilation path 110, second ventilation path 120, and third ventilation path 130 are, for example, ventilation ducts through which air passes.

First temperature sensor 140 is a temperature sensor, such as a thermistor, that detects a temperature in first ventilation path 110 (also referred to as a first temperature). For example, first temperature sensor 140 is provided in first ventilation path 110.

Second temperature sensor 150 is a temperature sensor, such as a thermistor, that detects a temperature in second ventilation path 120 (also referred to as a second temperature). For example, second temperature sensor 150 is provided in second ventilation path 120.

Third temperature sensor 160 is a temperature sensor, such as a thermistor, that detects a temperature in third ventilation path 130 (also referred to as a third temperature). For example, third temperature sensor 160 is provided in third ventilation path 130.

To adjust the ratio (hereinafter also referred to simply as a flow rate ratio) between the flow rate of air directed from first ventilation path 110 to third ventilation path 130 (also referred to as a first flow rate) and the flow rate of air directed from second ventilation path 120 to third ventilation path 130 (also referred to as a second flow rate), regulator 170 adjusts the degree of opening of each of first connection port 112, which connects first ventilation path 110 and third ventilation path 130, and second connection port 122, which connects second ventilation path 120 and third ventilation path 130. Thereby, the ratio between the first flow rate and the second flow rate is adjusted. For example, regulator 170 is a switch (ventilation path switch) capable of switching the flow path of air to third ventilation path 130 between first ventilation path 110 and second ventilation path 120 so that air is directed from first ventilation path 110 to third ventilation path 130 and/or from second ventilation path 120 to third ventilation path 130. In the present embodiment, regulator 170 is implemented by door 171 and actuator 172.

Door 171 is a member that regulates the movement of air directed from first ventilation path 110 to third ventilation path 130 and also regulates the movement of air directed from second ventilation path 120 to third ventilation path 130. Door 171 is, for example, a damper, which is changed in position and/or orientation by actuator 172 to adjust the degree of opening of first connection port 112 (that is, the width of first connection port 112) and the degree of opening of second connection port 122 (that is, the width of second connection port 122). For example, door 171 is provided on the side of first air inlet 111 and second air inlet 121, which is upstream of blower 180.

Actuator 172 is a drive unit for changing the position and/or orientation of door 171. Actuator 172 is implemented by, for example, a motor or the like.

Regulator 170 selectively directs, to third ventilation path 130, any one of air directed from only first ventilation path 110, air directed from only second ventilation path 120, or air directed from both first ventilation path 110 and second ventilation path 120. Further, regulator 170 adjusts the first flow rate and the second flow rate and directs, to third ventilation path 130, a mixture of air directed from first ventilation path 110 to third ventilation path 130 and air directed from second ventilation path 120 to third ventilation path 130.

Blower 180 is a blower that is embedded in seat 10 and moves air. Specifically, blower 180 is electrically connected to information processing unit 190 and driven and controlled by information processing unit 190. Thereby, blower 180 draws air from at least one of first air inlet 111 or second air inlet 121 and allows the drawn air to pass through at least one of first ventilation path 110 or second ventilation path 120 and further pass third ventilation path 130, thus blowing out the air from air outlet 131. Blower 180 is disposed, for example, downstream of regulator 170 in the ventilation path that includes first ventilation path 110, second ventilation path 120, and third ventilation path 130. In the present embodiment, blower 180 is disposed in third ventilation path 130, and blows air in third ventilation path 130 so that air flows from first air inlet 111 and second air inlet 121 toward air outlet 131.

In vehicle seat air conditioning device 100, first air inlet 111, second air inlet 121, and air outlet 131 are provided in seat 10, and first ventilation path 110, second ventilation path 120, third ventilation path 130, blower 180, and regulator 170 are embedded in seat 10. That is, all the components that generate airflow surrounding the person seated on seat 10 are provided in seat 10, so that the configuration of vehicle seat air conditioning device 100 can be simplified.

Note that the placement position of blower 180 is not particularly limited as long as air flows from at least one of first air inlet 111 or second air inlet 121 to regulator 170, and air flows from regulator 170 to air outlet 131.

Blower 180 may be disposed in each of first ventilation path 110 and second ventilation path 120, for example. Alternatively, blower 180 may be disposed in each of first ventilation path 110, second ventilation path 120, and third ventilation path 130, for example. As such, the number of blowers 180 is not particularly limited. The following description assumes that one blower 180 is disposed in third ventilation path 130 in the present embodiment.

Information processing unit 190 is a control device that controls each device, such as regulator 170 and blower 180, included in vehicle seat air conditioning device 100. Information processing unit 190 is implemented by a computer including, for example, an interface, a nonvolatile memory that stores a program, a volatile memory that serves as a temporary storage area for executing the program, and a processor that executes the program. The interface is connected to control lines that are connected to the devices included in vehicle seat air conditioning device 100, such as regulator 170, and to external equipment, such as vehicle air conditioning equipment 230.

Information processing unit 190 includes input port 191, controller 192, output unit 193, and memory 194.

Input port 191 is a processing unit that obtains various information used by controller 192 for processing. Input port 191 obtains, for example, a detection result (temperature information) from each of first temperature sensor 140, second temperature sensor 150, and third temperature sensor 160.

For example, input port 191 may obtain various information from external sensors, such as human presence sensor 220, and/or external equipment, such as vehicle air conditioning equipment 230, via an interface (communication interface) included in information processing unit 190. For example, input port 191 may obtain information such as a set temperature and an air volume from an input device, such as a touch panel, that accepts input from a user. Controller 192 may control regulator 170, blower 180, and the like based on the information thus accepted.

Controller 192 is a processing unit that controls each device, such as blower 180 and regulator 170, included in vehicle seat air conditioning device 100.

Controller 192 causes regulator 170 based on a first temperature that is the temperature in first ventilation path 110, a second temperature that is the temperature in second ventilation path 120, and a third temperature that is the temperature in third ventilation path 130 to adjust the degree of opening of each of first connection port 112 and second connection port 122. Thereby, controller 192 adjusts the ratio between the flow rate of air directed from first ventilation path 110 to third ventilation path 130 and the flow rate of air directed from second ventilation path 120 to third ventilation path 130. That is, controller 192 adjusts the flow rate ratio between the first flow rate and the second flow rate based on each piece of temperature information described above. Thus, controller 192 adjusts the third temperature, that is, the temperature of air blown out from air outlet 131. Specifically, controller 192 adjusts the flow rate ratio based on x (hereinafter also referred to as an air distribution ratio (an air distribution ratio on the side of first ventilation path 110)), calculated by the following Equation (1), where the first temperature is a, the second temperature is b, and the third temperature is c.

$$x=(c-b)/(a-b) \qquad \text{(Equation 1)}$$

Note that a>b. The units of a, b, and c need only be the same, and may be ° C. or K. The above Equation (1) is used to calculate the air distribution ratio by weight of air, and when the ratio by volume of air is calculated, the resultant value slightly differs from the value calculated by Equation (1). That is, x calculated by the above Equation (1) as the ratio by volume of air is not an exact value and contains an error, but this error is to an extent that does not cause a problem in practical use.

For example, when the absolute value of the difference between x and the target value is greater than or equal to a first threshold, based on temperature relationship information indicating the correlation between x and the degree of door opening, controller 192 adjusts the degree of door opening to change by a first variation so that x becomes the target value.

Figure 5:
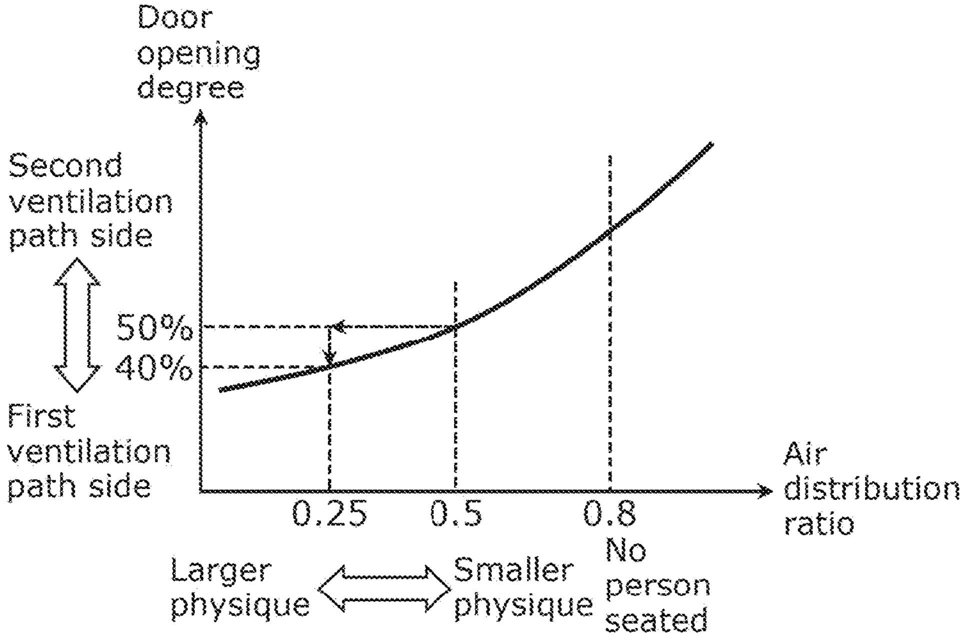
FIG. 5 is a diagram for explaining temperature relationship information according to the embodiment.

FIG. 5 is a diagram for explaining temperature relationship information according to the embodiment. Specifically, FIG. 5 is a graph illustrating the degree of door opening with respect to the air distribution ratio (x, described above) for setting the temperature to a predetermined temperature when a person of a predetermined physique (also referred to as standard build) sits on seat 10. For example, a degree of door opening of 0% is a state in which door 171 closes second connection port 122, and a state where first connection port 112 is completely open while second connection port 122 is completely closed. For example, a degree of door opening of 100% is a state in which door 171 closes first connection port 112, and a state where first connection port 112 is completely closed while second connection port 122 is completely open. For example, a degree of door opening of 50% is a state in which door 171 opens both first connection port 112 and second connection port 122 to the same extent, and a state where each of first connection port 112 and second connection port 122 is open.

For example, it is assumed that a person of standard build is seated on seat 10 and the degree of door opening is 50%. It is assumed here that a=33° C., b=25° C., and c=29° C. In this case, the air distribution ratio is calculated as x=(29−25)/(33−25)=0.5.

Next, it is assumed that a person of larger physique than the standard build is seated on seat 10 and the degree of door opening is 50%. It is assumed here that a=33° C., b=25° C., and c=27° C. In this case, the air distribution ratio is x=0.25.

Here, controller 192 causes regulator 170 using information from the graph illustrated in FIG. 5, that is, based on the temperature relationship information, to adjust the degree of door opening from 50% to 40% so that the air distribution ratio changes from 0.25 to 0.5, for example. That is, controller 192 changes, for example, the degree of door opening by 10%, which is the first variation. Thus, controller 192 can set the temperature of the air blown out from air outlet 131 to a predetermined temperature.

For example, memory 194 stores temperature relationship information, such as a graph or a table, indicating, for each temperature (corresponding to temperatures such as 24° C., 25° C., 26° C., etc. (predetermined temperatures)), the degree of door opening with respect to the air distribution ratio for setting the temperature.

For example, when the absolute value is less than the first threshold, and the absolute value is greater than or equal to a second threshold, controller 192 causes, based on the temperature relationship information, regulator 170 to change the degree of door opening by a second variation smaller than the first variation so that x becomes the target value. The first threshold is a value greater than the second threshold. Controller 192 changes the degree of door opening gradually, for example, when the absolute value is small, in other words, when the air distribution ratio is close to the target value, or in more specific terms, when the temperature of the air blown out from air outlet 131 is close to the desired temperature. For example, when the air distribution ratio is much different from the target value, controller 192 changes the degree of door opening by a large amount (for example, 10%) at once. When the air distribution ratio is not much different from the target value, controller 192 changes the degree of door opening by a small amount (for example, 1%) at once. Controller 192 performs a change as described above every few seconds or tens of seconds, for example, to adjust the air distribution ratio to approach the target value.

Note that thresholds, such as the first threshold, and variations (adjustment amounts) of the degree of door opening, such as the first variation, may be arbitrarily set. These pieces of information are stored in advance in memory 194, for example.

When the absolute value is less than the second threshold, controller 192 may control regulator 170 not to change the degree of door opening, that is, to maintain the current degree of door opening.

Controller 192 causes blower 180 based on, for example, the first temperature, the second temperature, and the third temperature to adjust the rotational frequency of blower 180. That is, for example, controller 192 adjusts the flow rate of the air blown out from air outlet 131 (also referred to as a third flow rate) based on each temperature information. For example, controller 192 adjusts the rotational frequency of blower 180 based on output relationship information indicating the correlation between the rotational frequency of blower 180 and the degree of door opening.

Figure 6:
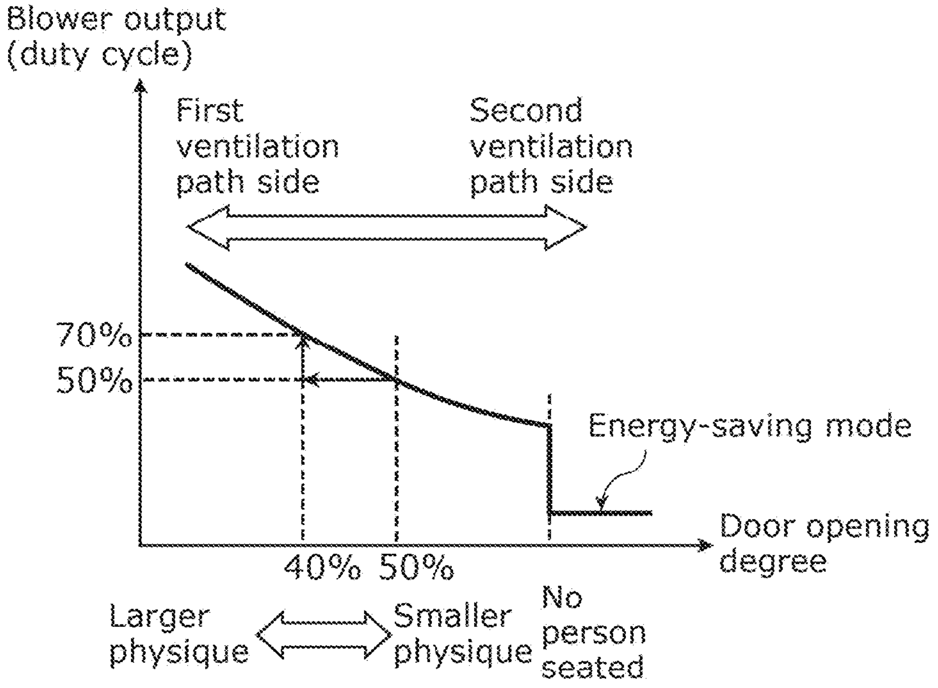
FIG. 6 is a diagram for explaining output relationship information according to the embodiment.

FIG. 6 is a diagram for explaining output relationship information according to the embodiment. Specifically, FIG. 6 is a graph illustrating the output of blower 180 (duty cycle, hereinafter also referred to simply as blower output) with respect to the degree of door opening for setting the amount of the air blown out from air outlet 131 to a predetermined amount when a person of standard build sits on seat 10. For example, a blower output of 50% means that blower 180 is driven at 50% of its maximum executable rotational frequency. The rotational frequency is the rotational frequency per unit time of a motor to which a fan for blowing air, included in blower 180, is attached (hereinafter also referred to simply as the rotational frequency of blower 180). For example, a blower output of 100% means that blower 180 is driven at its maximum executable rotational frequency.

For example, as described above with reference to FIG. 5, it is assumed that controller 192 adjusts the degree of door opening from 50% to 40% because a person of larger physique than a person of standard build sits on seat 10. In this case, for example, controller 192 changes the blower output from 50% to 70% so that the same flow rate of air (air volume) is blown out from air outlet 131 as when a person of standard build sits on seat 10. Thus, controller 192 can set the flow rate of the air blown out from air outlet 131 to a predetermined flow rate (predetermined air volume).

For example, memory 194 stores output relationship information, such as a graph or a table, indicating, for each air volume, the blower output with respect to the degree of door opening required to achieve the air volume.

Note that controller 192 may adjust the blower output, that is, the rotational frequency of blower 180, based on the air distribution ratio. For example, controller 192 adjusts the rotational frequency of blower 180 to become a predetermined rotational frequency based on x. Specifically, controller 192 may determine whether a person is seated on seat 10 based on x, and adjust the rotational frequency of blower 180 according to the determination result. For example, controller 192 determines whether a person is seated on seat 10 based on x. When determining that a person is seated on seat 10, controller 192 adjusts the rotational frequency of the blower to become a predetermined rotational frequency. When it determines that no person is seated on seat 10, controller 192 adjusts the rotational frequency of blower 180 to become a rotational frequency less than the predetermined rotational frequency. For example, when x is greater than or equal to a third threshold, controller 192 determines that no person is seated on seat 10. On the other hand, for example, when x is less than the third threshold, controller 192 determines that a person is seated on seat 10. That is, for example, when x is less than the third threshold, controller 192 adjusts the rotational frequency of blower 180 to become a predetermined rotational frequency. On the other hand, for example, when x is greater than or equal to the third threshold, controller 192 adjusts the rotational frequency of blower 180 to become a rotational frequency less than the predetermined rotational frequency. For example, in the present embodiment, the temperature of the air flowing through second ventilation path 120 is set lower than that of the air flowing through first ventilation path 110 by connecting second ventilation path 120 to vehicle air conditioning equipment 230 that sends cool air, so that cool air can be sent to a person seated on seat 10. In such a case, in a state where no person is seated on seat 10, the air distribution ratio is higher than when a person is seated on seat 10. Therefore, for example, in a case where x is large, for example in the example illustrated in FIG. 5, when x is greater than or equal to 0.8, controller 192 determines that no person is seated on seat 10 and reduces the rotational frequency of blower 180 compared to when a person is seated on seat 10.

Note that the rotational frequency of blower 180 and the third threshold may be arbitrarily set. These pieces of information are stored in advance in memory 194, for example.

Output unit 193 is a processing unit that outputs information and the like calculated by controller 192. Output unit 193 outputs information to notification equipment 210, such as x calculated by controller 192, the temperature of the air blown out from air outlet 131 predetermined in accordance with x, the output of blower 180, and the first temperature, the second temperature, and the third temperature, thereby notifying the user of the information via equipment 210.

Memory 194 is a storage device that stores information and the like indicating conditions such as the thresholds described above. Memory 194 is implemented by, for example, a flash memory, a hard disk drive (HDD), or the like.

Note that information processing unit 190 may be communicatively connected to external equipment such as notification equipment 210, human presence sensor 220, vehicle air conditioning equipment 230, and cabin temperature sensor 240.

Notification equipment 210 is equipment that notifies the user of information using sound and/or images, or the like. Notification equipment 210 obtains information from, for example, information processing unit 190, and outputs sound and/or images, or the like according to the obtained information. Notification equipment 210 is implemented by an amplifier and a speaker, and/or a display, or the like.

Human presence sensor 220 is a sensor that detects the presence of a person seated on seat 10. That is, human presence sensor 220 is a sensor that detects whether a person is seated on seat 10. Input port 191 obtains, for example, the detection result of human presence sensor 220 from human presence sensor 220. Controller 192 obtains the detection result, and further determines whether a person is seated on seat 10 based on x as described above. As described above, for example, when x is greater than or equal to the third threshold, controller 192 determines that no person is seated on seat 10. On the other hand, for example, when x is less than the third threshold, controller 192 determines that a person is seated on seat 10. When the detection result of human presence sensor 220 and the determination result of whether a person is seated on seat 10 based on x do not match, controller 192 outputs information indicating that the detection result and the determination result do not match. Output unit 193 outputs the information to notification equipment 210, for example, so that notification equipment 210 notifies the user of the information.

Human presence sensor 220 is implemented by an infrared sensor or the like, for example, but may be implemented by any component such as a camera.

Vehicle air conditioning equipment 230 is a system (heating, ventilation, and air conditioning (HVAC)) that controls air conditioning in a vehicle. Vehicle air conditioning equipment 230 is connected to second ventilation path 120, for example, and sends air (in the present embodiment, cool air with a temperature lower than that of the air in the cabin) to second air inlet 121 of second ventilation path 120.

Further, vehicle air conditioning equipment 230 includes, for example, an operation unit that accepts a user operation. The operation unit is an input interface installed in the vehicle. By accepting operation input from a person, the operation unit accepts, for example, setting instructions for the temperature and air volume of vehicle air conditioning equipment 230, and outputs information indicating the accepted setting instructions to information processing unit 190. For example, by accepting operation input from a person, the operation unit can output the set temperature in the cabin and the temperature of the air blown out by vehicle air conditioning equipment 230 to information processing unit 190. That is, information processing unit 190 may obtain information indicating the temperature of the air supplied from vehicle air conditioning equipment 230 to second ventilation path 120. Thus, for example, controller 192 may use, as the second temperature, air conditioning temperature information indicating the temperature of the air blown out by vehicle air conditioning equipment 230 disposed in the vehicle.

In this case, for example, vehicle seat air conditioning device 100 may not include second temperature sensor 150.

The operation unit may be implemented by a touch panel display or the like disposed in the vehicle, or by a smartphone, a tablet terminal, or the like.

Cabin temperature sensor 240 is a sensor (so-called in-car sensor) that detects the temperature in the vehicle cabin. Thus, in the vehicle where vehicle seat air conditioning device 100 is disposed, a sensor that detects the temperature in the vehicle cabin may be disposed in advance. In such a case, for example, controller 192 may use, as the first temperature, the temperature detected by cabin temperature sensor 240, which is disposed in the vehicle cabin and detects the temperature in the cabin.

In this case, for example, vehicle seat air conditioning device 100 may not include first temperature sensor 140.

Although not illustrated, a power supply may be provided including a power supply circuit or the like that supplies electric power to each device included in vehicle seat air conditioning device 100, such as blower 180 and regulator 170, via information processing unit 190 or the like. For example, the power supply may be a direct-current power source supplied from a battery (not illustrated). For example, the power supply is controlled by information processing unit 190 to adjust the current supplied to blower 180 and regulator 170.

For example, information processing unit 190 may include a timing unit such as a real time clock (RTC).

[Processing Procedure]

Subsequently, a processing procedure performed by vehicle seat air conditioning device 100 will be described.

<Overview>

Figure 7:
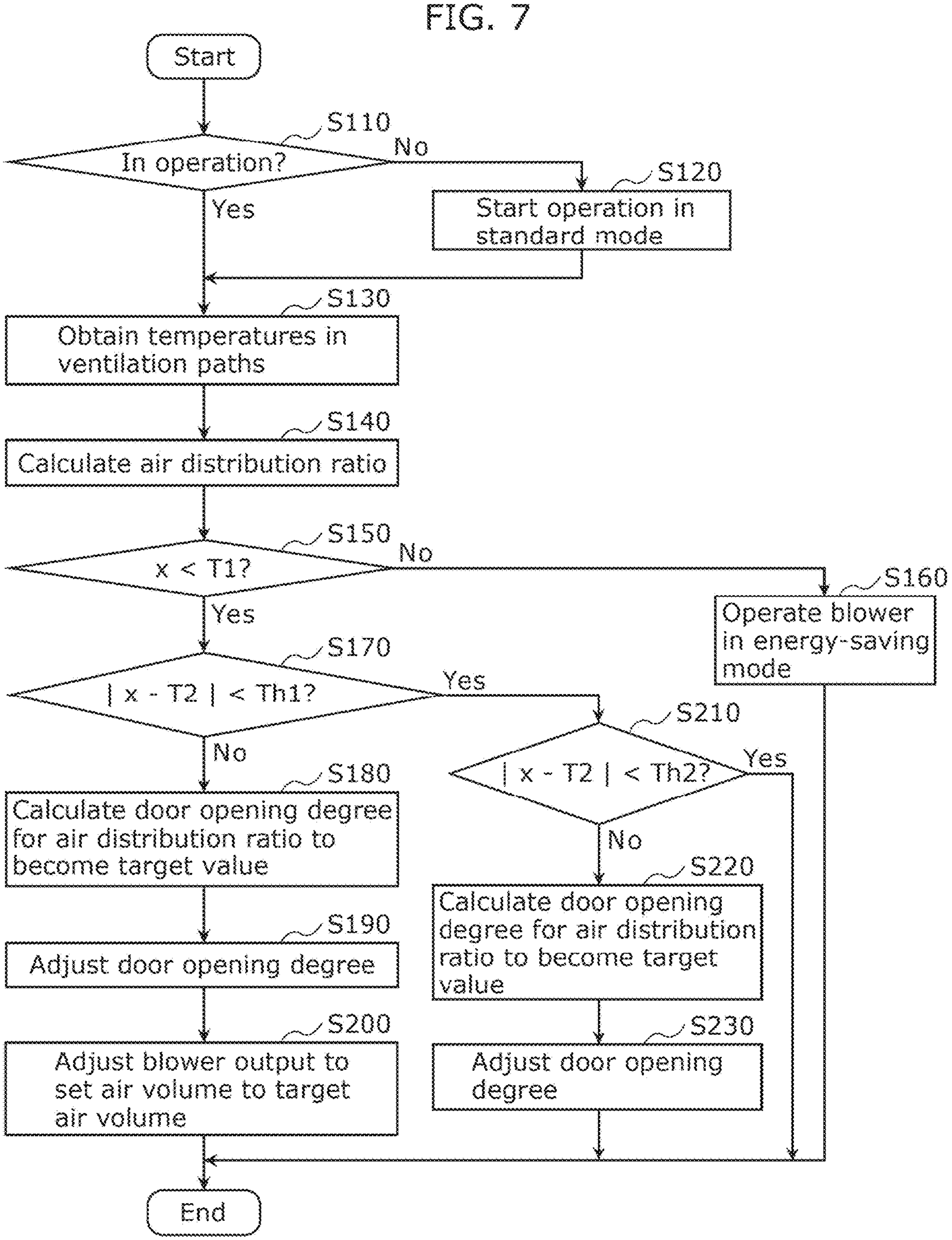
FIG. 7 is a flowchart illustrating a processing procedure for the vehicle seat air conditioning device according to the embodiment.

FIG. 7 is a flowchart illustrating a processing procedure for vehicle seat air conditioning device 100 according to the embodiment.

First, controller 192 determines whether vehicle seat air conditioning device 100 is in operation (S110). For example, controller 192 determines whether regulator 170 and blower 180 are being driven.

When determining that vehicle seat air conditioning device 100 is not in operation (No in S110), controller 192 starts the operation in a standard mode (S120). The standard mode is, for example, a mode in which controller 192 controls regulator 170 and blower 180 so that when a person of standard build sits on seat cushion 20, air with a predetermined temperature and predetermined air volume is blown from air outlet 131 toward the person.

Next to step S120, or when controller 192 determines in step S110 that vehicle seat air conditioning device 100 is in operation (Yes in S110), input port 191 obtains the temperatures in first ventilation path 110, second ventilation path 120, and third ventilation path 130, that is, the first temperature, the second temperature, and the third temperature (S130). For example, input port 191 obtains temperature information indicating the first temperature from first temperature sensor 140, obtains temperature information indicating the second temperature from second temperature sensor 150, and obtains temperature information indicating the third temperature from third temperature sensor 160. Input port 191 may obtain temperature information indicating the first temperature from cabin temperature sensor 240, and obtain temperature information indicating the second temperature from vehicle air conditioning equipment 230.

Next, controller 192 calculates an air distribution ratio (that is, x, described above) based on the first temperature, the second temperature, and the third temperature (S140).

Next, controller 192 determines whether x is less than T1 (S150). T1 is an example of the third threshold described above. That is, controller 192 determines whether x is greater than or equal to the third threshold.

When determining that x is not less than T1 (No in S150), that is, when determining that no person is seated on seat 10, controller 192 operates blower 180 in an energy-saving mode (S160). The energy-saving mode is a mode in which blower 180 is operated at a low output. For example, in the energy-saving mode, controller 192 causes blower 180 to adjust the rotational frequency of blower 180 so that the rotational frequency becomes smaller than the predetermined rotational frequency described above.

When determining that x is less than T1 (Yes in S150), that is, when determining that a person is seated on seat 10, controller 192 determines whether the absolute value of the difference between x and T2 is less than Th1 (S170). T2 is an example of the target value described above, and Th1 is an example of the first threshold described above. That is, controller 192 determines whether the absolute value of the difference between x and the target value is greater than or equal to the first threshold.

When determining that the absolute value of the difference between x and T2 is not less than Th1 (No in S170), that is, when determining that the absolute value of the difference between x and the target value is greater than or equal to the first threshold, controller 192 calculates the degree of door opening at which x becomes the target value (S180). Controller 192 calculates the degree of door opening based on, for example, x and the temperature relationship information. For example, when the degree of door opening before adjustment is changed in 10% increments, such as 10%, 20%, or 30%, controller 192 calculates the degree of door opening closest to the degree of door opening at which x becomes the target value.

Next, controller 192 causes regulator 170 to adjust the degree of door opening so that the degree of door opening becomes the calculated degree of door opening (S190).

Next, controller 192 causes blower 180 to adjust the output (for example, the rotational frequency) of blower 180 so that the air volume blown out from air outlet 131 becomes the target air volume (S200).

On the other hand, when determining that the absolute value of the difference between x and T2 is less than Th1 (Yes in S170), controller 192 determines whether the absolute value of the difference between x and T2 is less than Th2 (S210). Th2 is an example of the second threshold described above. That is, controller 192 determines whether the absolute value of the difference between x and the target value is greater than or equal to the second threshold.

When determining that the absolute value of the difference between x and T2 is not less than Th2 (No in S210), that is, when determining that the absolute value of the difference between x and the target value is less than the first threshold and greater than or equal to the second threshold, controller 192 calculates the degree of door opening at which x becomes the target value (S220). Controller 192 calculates the degree of door opening based on, for example, x and the temperature relationship information. For example, when the degree of door opening before adjustment is changed in 1% increments, such as 1%, 2%, or 3%, controller 192 calculates the degree of door opening closest to the degree of door opening at which x becomes the target value. Next, controller 192 causes regulator 170 to adjust the degree of door opening so that the degree of door opening becomes the calculated degree of door opening (S230).

Note that controller 192 does not need to adjust the output of blower 180 when determining that the absolute value of the difference between x and T2 is not less than Th2.

On the other hand, when determining that the absolute value of the difference between x and T2 is less than Th2 (Yes in S210), controller 192 terminates the process and causes regulator 170 and blower 180 to maintain the current state.

Vehicle seat air conditioning device 100 controls regulator 170 and blower 180 to blow out air with a predetermined temperature and a predetermined air volume from air outlet 131, for example, by performing the process described above periodically, such as every 10 seconds.

<Specific Example>

Subsequently, a specific processing procedure for vehicle seat air conditioning device 100 will be described with reference to the flowchart illustrated in FIG. 7. Note that the numerical values shown in the specific example described below are only examples and may differ from the numerical values actually used. The numerical values used in the present embodiment may be arbitrarily set.

In the specific example described below, T1, the threshold for determining whether a person is seated on seat 10, is 0.8. In the following description, T2, the target value of the air distribution ratio, is 0.5. In the following description, Th1, the threshold for determining a large deviation between the current air distribution ratio and the target value, is 0.1. In the following description, Th2, the threshold for determining that the current air distribution ratio has reached the target value, is 0.01.

First, it is assumed that a person of larger physique than the standard build sits on seat 10 before vehicle seat air conditioning device 100 is put into operation. At this time, for example, it is assumed that the person inputs an instruction to operate vehicle seat air conditioning device 100 into an input device or the like (not illustrated). For example, when obtaining the instruction, vehicle seat air conditioning device 100 determines No in step S110 and starts the operation in the standard mode in step S120. Here, it is assumed that controller 192 controls regulator 170 and blower 180 so that the degree of door opening becomes 50% and the blower output becomes 50%.

Note that the temperatures of the air in first ventilation path 110, second ventilation path 120, and third ventilation path 130 may not be stable immediately after blower 180 is operated. Therefore, information processing unit 190 may wait a predetermined time, such as several tens of seconds, from the execution of step S120 to the execution of step S130. Time information indicating such a time may be arbitrarily determined, and is stored in advance in memory 194, for example.

Next, it is assumed that input port 191 obtains temperature information in step S130, where the first temperature (a, described above) is 33° C., the second temperature (b, described above) is 25° C., and the third temperature (c, described above) is 29° C. In this case, controller 192 calculates x as 0.25 in step S140.

Next, controller 192 determines Yes in step S150 because x is smaller than T1 (x=0.25<T1=0.8).

Next, controller 192 determines No in step S170 because the absolute value of the difference between x and T2 is greater than Th1 (|x−T2|=0.25>Th1=0.1).

Next, in steps S180 to S200, controller 192 causes regulator 170 to adjust the degree of door opening from 50% to 40% and controls blower 180 to adjust the blower output from 50% to 70%, based on the calculated x, the temperature relationship information illustrated in FIG. 5, and the output relationship information illustrated in FIG. 6.

Next, vehicle seat air conditioning device 100 starts the process again in step S110, for example, after 10 seconds.

Controller 192 determines Yes in step S110 because vehicle seat air conditioning device 100 is already in operation.

Next, it is assumed that input port 191 obtains temperature information in step S130, where the first temperature is 33° C., the second temperature is 25° C., and the third temperature is 28.5° C. In this case, controller 192 calculates x as 0.43 in step S140.

Next, controller 192 determines Yes in step S150 because x is smaller than T1 (x=0.43<T1=0.8).

Next, controller 192 determines Yes in step S170 because the absolute value of the difference between x and T2 is smaller than Th1 ($|x-T2|=0.07<Th1=0.1$), Next, controller 192 determines No in step S210 because the absolute value of the difference between x and T2 is greater than Th2 ($|x-T2|=0.07>Th2=0.01$).

Next, in steps S220 to S230, controller 192 causes regulator 170 based on the calculated x and the temperature relationship information illustrated in FIG. 5 to adjust the degree of door opening from 40% to 39%. Further, controller 192 maintains the blower output at 70%.

Next, for example, 10 seconds later, vehicle seat air conditioning device 100 starts the process again from step S110.

Controller 192 determines Yes in step S110 because vehicle seat air conditioning device 100 is already in operation.

Next, it is assumed that input port 191 obtains temperature information in step S130, where the first temperature is 33° C., the second temperature is 25° C., and the third temperature is 29° C. In this case, controller 192 calculates x as 0.5 in step S140.

Next, controller 192 determines Yes in step S150 because x is smaller than T1 ($x=0.5<T1=0.8$).

Next, controller 192 determines Yes in step S170 because the absolute value of the difference between x and T2 is smaller than Th1 ($|x-T2|=0<Th1=0.1$).

Next, controller 192 determines Yes in step S210 because the absolute value of the difference between x and T2 is smaller than Th2 ($|x-T2|=0>Th2=0.01$). In this case, controller 192 maintains the degree of door opening at 39% and the blower output at 70%.

When a predetermined condition is met, controller 192 may correct the temperature relationship information and the output relationship information based on the first temperature, the second temperature, and the third temperature.

In a state where no person is seated on seat 10, the value of x becomes a specific value (for example, the third threshold, which is 0.8 in the present embodiment) when the degree of door opening and the blower output are under specific conditions, such as the degree of door opening at 50% and the blower output at 50%.

However, when a part of first air inlet 111 is blocked by clogging or the like in seat 10, x becomes a value different from the specific value even under the specific conditions.

Thus, for example, x in a state where no person is seated on seat 10 is calculated, and the temperature relationship information and the output relationship information are corrected based on this x.

Figure 8:
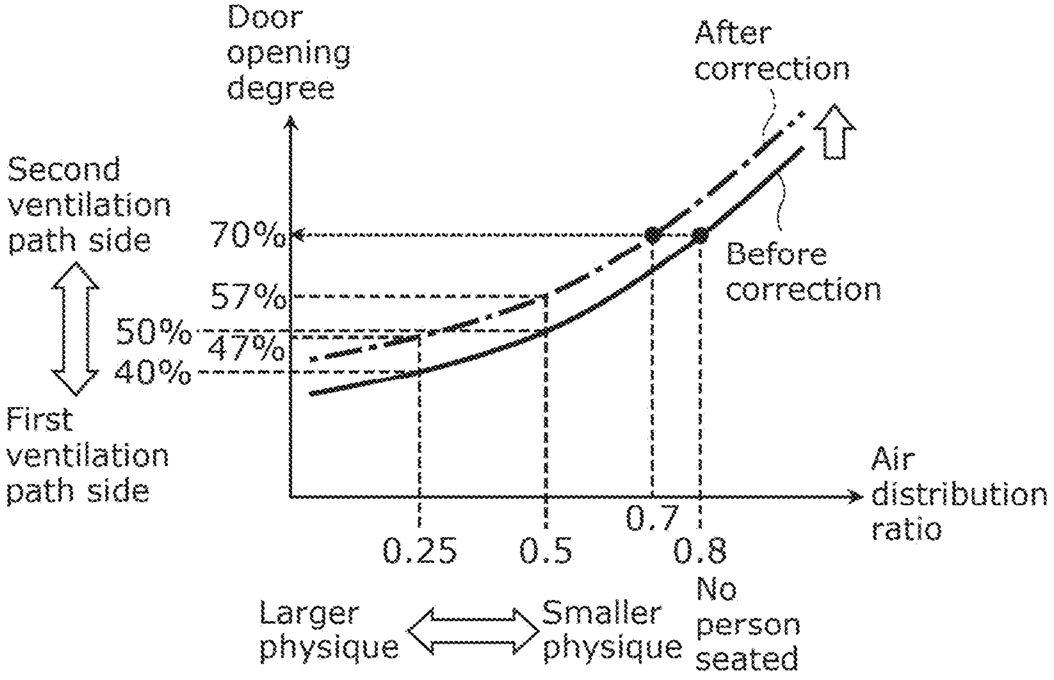
FIG. 8 is a diagram for explaining a correction to the temperature relationship information according to the embodiment.

FIG. 8 is a diagram for explaining a correction to the temperature relationship information according to the embodiment. Note that the solid line illustrated in a graph in FIG. 8 represents temperature relationship information before correction, which is the same as the temperature relationship information illustrated in FIG. 5, and the dashed line illustrated in a graph in FIG. 8 represents temperature relationship information obtained by correcting the temperature relationship information before correction (temperature relationship information after correction).

First, controller 192 determines whether a predetermined condition is met. When determining that the predetermined condition is met, controller 192 starts a process of correcting the temperature relationship information and the output relationship information (correction process).

A case where the predetermined condition is met is, for example, a case where no person is seated on seat 10 or a case where a predetermined person is seated on seat 10.

When, for example, the ignition (power) off of the vehicle is detected, the opening and closing of the vehicle door is detected, and further, the locking of the vehicle door is detected, controller 192 determines that there is no occupant in the vehicle, that is, no person is seated on seat 10. The vehicle may include various sensors that perform these detections, and input port 191 may obtain the results of these detections from the various sensors.

Alternatively, whether a person is seated on seat 10 may be determined based on the detection result of human presence sensor 220.

The predetermined person may be arbitrarily determined in advance, and is not particularly limited. The predetermined person is, for example, a person for whom the value of x under specific conditions at a normal time (specifically, when a part of first air inlet 111 is not blocked by clogging or the like) is known in advance. For example, input port 191 obtains an image of the predetermined person taken by a camera and stores the image in memory 194. Controller 192 may determine, for example, whether the predetermined person is seated on seat 10 based on the image and the result of the camera taking an image of the person seated on seat 10. Alternatively, input port 191 may obtain information indicating that the predetermined person is seated from an input device, such as a touch panel, that accepts input from the user.

When accepting an instruction from the user via the input device to start the process of correcting the temperature relationship information and/or output relationship information, controller 192 may determine that the predetermined condition is met and start the correction process.

When determining that the predetermined condition is met, controller 192 controls regulator 170 and blower 180 so that the degree of door opening and the blower output meet specific conditions.

Note that the specific conditions may be arbitrarily determined in advance, and are not particularly limited. In the present embodiment, the specific conditions are a degree of door opening of 50% and a blower output of 50%. Information indicating the specific conditions is stored in advance in memory 194, for example.

Input port 191 obtains the first temperature, the second temperature, and the third temperature from first temperature sensor 140, second temperature sensor 150, and third temperature sensor 160 in a state where regulator 170 and blower 180 are controlled to meet the specific conditions. Controller 192 calculates x based on the obtained first temperature, second temperature, and third temperature.

Here, when x is calculated in a state where seat 10 is not particularly clogged or the like, for example, it is assumed that x (air distribution ratio) is 0.8, as in the case of "No person seated" in the temperature relationship information before correction indicated by the solid line in FIG. 8. On the other hand, for example, it is assumed that x calculated by controller 192 when the predetermined condition is met is 0.7.

In this case, for example, controller 192 corrects the temperature relationship information so that the degree of door opening (70% in the example illustrated in FIG. 8) when x is 0.8 in the temperature relationship information before correction becomes the same as the degree of door opening (that is, 70%) when x is 0.7. For example, controller 192 corrects the temperature relationship information indicated by the solid line in FIG. 8 to become the temperature relationship information indicated by the dashed line in FIG. 8.

Thus, for example, in the case of x being 0.5, when the temperature relationship information before correction is used, the degree of door opening is calculated to be 50%, whereas when the temperature relationship information after correction is used, the degree of door opening is calculated to be 57%. For example, in the case of x being 0.25, when the temperature relationship information before correction is used, the degree of door opening is calculated to be 40%, whereas when the temperature relationship information after correction is used, the degree of door opening is calculated to be 47%. That is, more air is drawn in from second air inlet 121 than from first air inlet 111 after correction compared to before correction.

Figure 9:
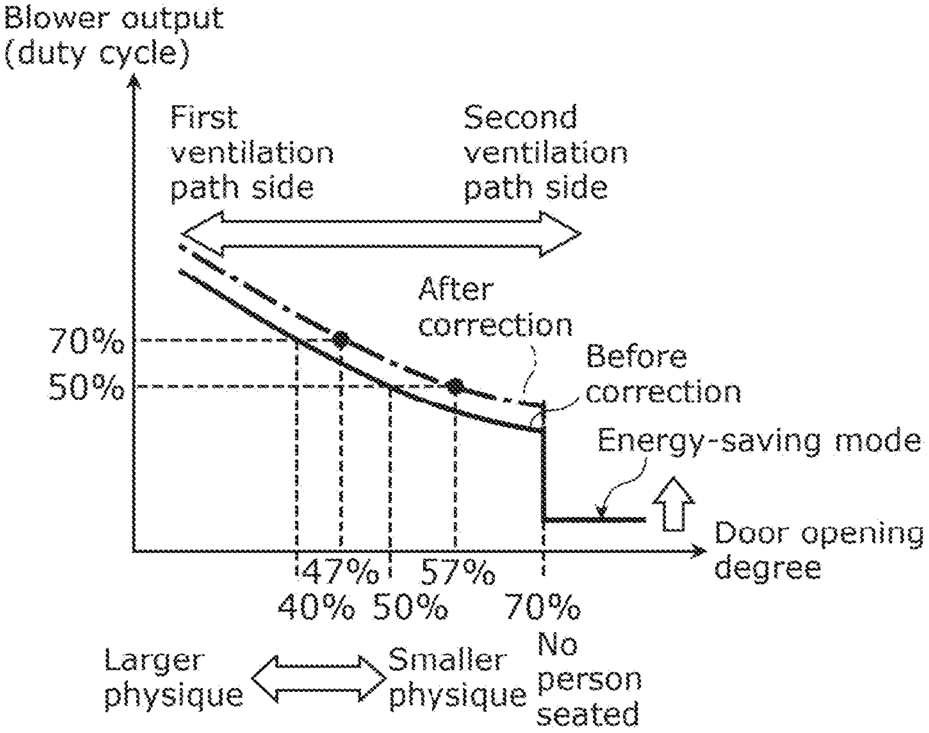
FIG. 9 is a diagram for explaining a correction to the output relationship information according to the embodiment.

FIG. 9 is a diagram for explaining a correction to the output relationship information according to the embodiment. Note that the solid line illustrated in a graph in FIG. 9 represents output relationship information before correction, which is the same as the output relationship information illustrated in FIG. 6, and the dashed line illustrated in a graph in FIG. 9 represents output relationship information obtained by correcting the output relationship information before correction (output relationship information after correction).

Controller 192 corrects the output relationship information based on x calculated using the first temperature, the second temperature, and the third temperature in a state where regulator 170 and blower 180 are controlled to meet the specific conditions. Specifically, controller 192 corrects the output relationship information based on the temperature relationship information after correction determined based on the calculated x.

For example, controller 192 corrects the output relationship information so that in the output relationship information after correction, the degree of door opening is calculated as 57% and the blower output as 50%, whereas in the output relationship information before correction, the degree of door opening is calculated as 50% and the blower output as 50%. For example, controller 192 corrects the output relationship information so that in the output relationship information after correction, the degree of door opening is calculated as 40% and the blower output as 70%, whereas in the output relationship information before correction, the degree of door opening is calculated as 47% and the blower output as 70%. That is, the output relationship information is corrected so that the blower output corresponding to the degree of door opening based on the temperature relationship information before correction and the blower output corresponding to the degree of door opening based on the temperature relationship information after correction are the same for the calculated x.

As described above, for example, controller 192 corrects the temperature relationship information based on the first temperature, the second temperature, and the third temperature in a state where no person is seated on seat 10 or in a state where the predetermined person is seated on seat 10. For example, controller 192 corrects the output relationship information based on the first temperature, the second temperature, and the third temperature in a state where no person is seated on seat 10 or in a state where the predetermined person is seated on the seat.

Controller 192 corrects the temperature relationship information by, for example, selecting one piece of temperature relationship information from a plurality of pieces of temperature relationship information each having a different correlation between the calculated x and the degree of opening, based on the first temperature, the second temperature, and the third temperature. For example, controller 192 corrects the output relationship information by selecting one piece of output relationship information from a plurality of pieces of output relationship information each having a different correlation between the rotational frequency of blower 180 (blower output) and the degree of opening (degree of door opening), based on the first temperature, the second temperature, and the third temperature. The plurality of pieces of temperature relationship information and the plurality of pieces of output relationship information are associated with the value of x and stored in advance in memory 194, for example.

Note that controller 192 may change the temperature relationship information and the output relationship information stored in memory 194 by a predetermined calculation method according to the value of x.

Controller 192 may calculate x based on the first temperature, the second temperature, and the third temperature in a state where no person is seated on seat 10, and when the calculated x is less than or equal to a fourth threshold lower than the third threshold, controller 192 may cause notification equipment 210 to notify information indicating that first air inlet 111 is clogged.

When the calculated x is excessively small, it is considered that seat 10 (specifically, seat surface 21) is significantly clogged and is in a poor state. Therefore, in such a case, controller 192 urges the user to improve the clogging state of seat 10 by, for example, causing notification equipment 210 to notify the user of information indicating that seat 10 is clogged.

Note that the fourth threshold may be arbitrarily determined in advance, and is not particularly limited. For example, the fourth threshold may be determined as 0.7. The fourth threshold may be determined as the third threshold minus a predetermined value.

For example, controller 192 may calculate x based on the first temperature, the second temperature, and the third temperature in a state where no person is seated on seat 10, and when the calculated x differs from the third threshold (for example, the third threshold such as 0.8 stored in memory 194), the third threshold may be changed to the calculated x. With this configuration, when the third threshold is used to determine whether a person is seated on seat 10, an appropriate value is set as the third threshold even if, for example, seat 10 is clogged or the like.

[Effects, Etc.]

As described above, vehicle seat air conditioning device 100 according to the embodiment of the present invention is an air conditioning device used for seat 10 disposed in a vehicle. Vehicle seat air conditioning device 100 includes first ventilation path 110 through which air drawn in by blower 180 passes from first air inlet 111 provided on the surface (in the present embodiment, seat surface 21) of seat 10 that is located on the face of seat 10 on which a person is seated. Vehicle seat air conditioning device 100 includes second ventilation path 120 through which air drawn in by blower 180 passes from second air inlet 121 provided at a location (in the present embodiment, lower surface 22) in seat 10 other than the surface of seat 10, and third ventilation path 130 through which air directed from at least one of first ventilation path 110 or second ventilation path 120 is directed to air outlet 131 provided on the surface (in the present embodiment, front surface 31) of seat back 30 that is the surface located on the face of seat 10 on which the person is seated.

In such a structure, the way first air inlet 111 is blocked varies depending on the way of sitting, the physique, or the like of the person seated on seat 10. Therefore, in the structure where the temperature is adjusted by mixing the air drawn in from first air inlet 111 with the air drawn in from second air inlet 121, and the air is blown out from air outlet 131, the temperature of the air blown out from air outlet 131 varies depending on the way of sitting, the physique, or the like of the person seated on seat 10. For example, when a person of larger physique than a person of standard build sits on seat 10, the air distribution ratio changes because the air volume from first air inlet 111 decreases.

Therefore, vehicle seat air conditioning device 100 includes regulator 170 and controller 192. Regulator 170 adjusts the flow rate ratio by adjusting the degree of opening of first connection port 112 and the degree of opening of second connection port 122 (that is, the degree of door opening described above). Controller 192 causes regulator 170 based on the first temperature, the second temperature, and the third temperature to adjust the degree of door opening, thereby adjusting the flow rate ratio.

With this configuration, controller 192 controls regulator 170, so that the temperature of the air blown toward a person seated on seat 10 can be adjusted to an appropriate temperature without detecting the way of sitting, the physique, or the like of the person seated on seat 10 using a camera or the like, and regardless of the way of sitting, the physique, or the like of the person seated on seat 10. Therefore, according to vehicle seat air conditioning device 100, it is possible to provide a comfortable air conditioning environment for a person seated on seat 10 while suppressing a cost increase.

For example, the air distribution ratios when people with various physiques sit on seat 10 are made into a table or an appropriate function. From this, data on the amount of change in the opening of door 171 (first connection port 112 and second connection port 122) to restore the air distribution ratio and data on the amount of change in the rotational frequency of blower 180 to restore the air volume are obtained in advance. Controller 192 can refer to the data thus obtained and change the angle of door 171 and the rotational frequency of blower 180 to make the air volume and air distribution ratio the same as those initially.

To obtain the target air distribution ratio, a method of feedback control for the amount of opening and closing of door 171 may be employed.

This enables a person seated on seat 10 to obtain a comfortable warm or cool feeling regardless of the physique of the person.

As described above, it is assumed that the amount of air drawn in from first air inlet 111 is likely to change depending on the physique of a person seated on seat 10. On the other hand, it is assumed that the amount of the air drawn in from second air inlet 121 and the amount of the air blown out from air outlet 131 are unlikely to change depending on the physique of a person seated on seat 10. Therefore, data indicating the air distribution ratio in a state where no person is seated on seat 10 and the air distribution ratio in a state where a person of standard build is seated on seat 10 is obtained in advance. Thus, when calculating the actual air distribution ratio, controller 192 determines the physique or the seated state of the person seated on seat 10 and changes the rotational frequency of blower 180 and the degree of door opening using the obtained data. Accordingly, the amount and temperature of the air drawn in from first air inlet 111 and the amount and temperature of the air blown out from air outlet 131 are maintained in appropriate states to ensure comfort. For example, when the temperature of the air drawn in from second air inlet 121, such as the air blown out by vehicle air conditioning equipment 230, can be adjusted as in the present embodiment, the temperature of the air blown out from air outlet 131 can be maintained in an appropriate state.

For example, controller 192 adjusts the degree of door opening based on x, the target value, and the temperature relationship information. In the present embodiment, when the absolute value of the difference between x and the target value is greater than or equal to a first threshold, controller 192 adjusts the degree of door opening to change by a first variation. When the absolute value is less than the first threshold and the absolute value is greater than or equal to a second threshold, controller 192 causes regulator 170 to change the degree of door opening by a second variation smaller than the first variation.

When the difference between x and the target value is very large and the degree of door opening is changed significantly at once, there is a concern that door 171 may not be positioned appropriately and the degree of door opening may deviate from the desired one depending on the performance of actuator 172. Further, when the difference between x and the target value is very large and the degree of door opening is changed significantly, there is a concern that the temperature of the air blown out from air outlet 131 may rapidly change and the person seated on seat 10 may feel uncomfortable. Therefore, by adjusting the degree of door opening in increments of 10%, 1%, or the like according to the magnitude of the absolute value, that is, the magnitude of the difference between x and the target value, controller 192 can appropriately adjust the degree of door opening and prevent the person seated on seat 10 from feeling uncomfortable due to a rapid change in the temperature of the air blown out from air outlet 131.

For example, controller 192 adjusts the rotational frequency of blower 180 based on the first temperature, the second temperature, and the third temperature. For example, when x is greater than or equal to a third threshold, controller 192 determines that no person is seated on seat 10, and shifts to the energy-saving mode to reduce the rotational frequency of blower 180.

With this configuration, for example, when the air volume of the air blown out from air outlet 131 need not be so high for the purpose of circulating air in the cabin or other purposes, it is possible to prevent an unnecessary increase in the rotational frequency and the resultant increase in power consumption.

In such a case, controller 192 may stop blower 180.

When the detection result of human presence sensor 220 and the determination result of whether a person is seated on seat 10 based on x do not match, controller 192 may output information indicating that those results do not match.

When the detection result of human presence sensor 220 and the determination result of controller 192 do not match, specifically, when human presence sensor 220 determines that the seat is not occupied (that is, no person is seated on seat 10), but controller 192 determines, in its seating determination based on the air distribution ratio, that the seat is occupied (that is, a person is seated on seat 10), for example, first air inlet 111 may be clogged with dust or the like, and air may not be able to be appropriately drawn in from first air inlet 111. In such a state, even if the degree of door opening is adjusted, the temperature and air volume of the air blown out from air outlet 131 may not reach appropriate states. Therefore, for example, output unit 193 uses notification equipment 210 to notify the user of information indicating that first air inlet 111 may be clogged. This can prompt the user to perform cleaning or the like on outlet 131, thereby preventing the temperature and air volume of the air blown out from air outlet 131 from failing to reach appropriate states.

(Other Variations, Etc.)

Although the present disclosure has been described above based on the embodiment, the present disclosure is not limited to the above embodiment.

For example, at least one of first air inlet 111 or second air inlet 121 may be formed in seat back 30. Second air inlet 121 may be provided to face an air outlet of a heating, ventilation, and air conditioning (HVAC) system (for example, a duct in a center console).

For example, second air inlet 121 may open toward the interior of the cabin in the same manner as first air inlet 111. For example, first air inlet 111 may be connected to vehicle air conditioning equipment 230.

For example, the number of first air inlets 111, the number of second air inlets 121, and the number of air outlets 131 may each be one, two or more, or any number.

For example, regulator 170 may include separate doors for adjusting the degree of opening of first connection port 112 and for adjusting the degree of opening of second connection port 122. For example, the mechanism for adjusting the degree of opening of first connection port 112 and the degree of opening of second connection port 122 may be a throttle valve or the like rather than a plate body such as a door. With these configurations, even if the degree of opening of one of first connection port 112 or second connection port 122 is changed, the degree of opening of the other is not changed, making it easier to adjust each degree of opening with high precision.

For example, second air inlet 121 may be provided on rear surface 32 of seat back 30, which is the surface opposite to front surface 31, or the surface of headrest 40 where the head of a person seated on seat 10 does not contact, or at other locations.

For example, vehicle seat air conditioning device 100 may not necessarily include all the components illustrated in FIG. 4. For example, vehicle seat air conditioning device 100 may not include first temperature sensor 140. For example, vehicle seat air conditioning device 100 may not include second temperature sensor 150.

For example, vehicle seat air conditioning device 100 may have a function to adjust the air volume of blower 180. In this case, controller 192 may correct the target temperature of the air blown out from air outlet 131 (target blowing temperature) to a lower temperature when the air volume of blower 180 is set to "high" during cooling, and may correct the target blowing temperature to a higher temperature when the air volume of blower 180 is set to "low".

For example, an air conditioning device such as an air conditioner capable of performing heating and cooling may be installed separately. Vehicle seat air conditioning device 100 may be capable of directly drawing in the conditioned air blown out of the air conditioning device.

For example, seat 10 may include a seat heater. The seat heater is provided on at least one of seat cushion 20 or seat back 30 of the vehicle or the like, and generates heat to warm the back, waist, buttocks, thighs, and other parts of a person. The seat heater heats seat 10 in a heating setting and does not heat seat 10 in a non-heating setting. The seat heater may include a base material and a heater wire. The base material may be a nonwoven fabric formed of a material having elasticity, flexibility, and ductility, a foam resin such as urethane in fabric form, or the like. The heater wire may be a conductive wire that is electrically connected to controller 192 or the like for controlling electric power supplied to the heater wire, and generates heat by electric power from the power supply controlled by controller 192. Controller 192 may be able to control the amount of heat generated by the heater wire by turning the current supplied to the heater wire on and off or by changing the current value.

For example, the second temperature may be higher than the first temperature. For example, vehicle air conditioning equipment 230 may send air with a temperature higher than that in the cabin to second ventilation path 120.

Third temperature sensor 160 may be on the side of air outlet 131, or on the side of first air inlet 111 and second air inlet 121, with respect to blower 180.

For example, each processing unit, such as controller 192 included in vehicle seat air conditioning device 100, may typically be implemented as a large-scale integrated circuit (LSI), which is an integrated circuit. These may each be formed into a separate chip, or one chip may be formed to include some or all of them.

The integrated circuit is not limited to the LSI and may be implemented by a dedicated circuit or a general-purpose processor. A field programmable gate array (FPGA), which can be programmed after LSI manufacturing, or a reconfigurable processor, which can reconfigure the connections and settings of circuit cells inside the LSI, may be used.

Each component may be configured by dedicated hardware or may be implemented by executing a software program suitable for each component. Each component may be implemented by a program execution unit, such as a central processing unit (CPU) or a processor, reading and executing a software program recorded on a recording medium, such as a hard disk or a semiconductor memory.

All the numbers used above are illustrated to specifically describe the present disclosure, and the present disclosure is not limited to the numbers illustrated in the above embodiment.

The division of the functional blocks in the block diagram is an example. A plurality of functional blocks may be implemented as one functional block, one functional block may be divided into a plurality of functional blocks, or some functions may be transferred to other functional blocks. The functions of a plurality of function blocks having similar functions may be processed in parallel or in a time-division manner by a single piece of hardware or software.

The order in which the steps in the flowchart are performed is illustrated to specifically describe the present disclosure and may be any order other than the one shown. Some of the above steps may be performed simultaneously (in parallel) with other steps.

The method performed by controller 192 described above may be used in any combination of one or more methods.

The present disclosure also includes forms that can be obtained by applying various modifications, which a person skilled in the art can conceive, to the above embodiment, and forms that can be implemented by any combination of the components and functions in the above embodiment without departing from the gist of the present disclosure.

(Supplementary Note)

According to the description of the above embodiment, the following techniques are disclosed.

<Technique 1>

A vehicle seat air conditioning device disposed in a vehicle and used for a seat including a seat back and a seat cushion, the vehicle seat air conditioning device comprising:

a blower embedded in the seat;

a first ventilation path through which air drawn in by the blower passes from a first air inlet provided on a surface of the seat that is located on a face of the seat on which a person is seated;

a second ventilation path through which air drawn in by the blower passes from a second air inlet that is an air inlet different from the first air inlet and provided at a location in the seat other than the surface of the seat;

a third ventilation path through which air directed from at least one of the first ventilation path or the second ventilation path is directed to an air outlet provided on a surface of the seat back that is a surface located on the face of the seat on which the person is seated;

a regulator that adjusts a ratio between a flow rate of air directed from the first ventilation path to the third ventilation path and a flow rate of air directed from the second ventilation path to the third ventilation path by adjusting a degree of opening of each of a first connection port and a second connection port, the first connection port connecting the first ventilation path and the third ventilation path, the second connection port connecting the second ventilation path and the third ventilation path; and a controller that controls the blower and the regulator, wherein the controller adjusts the ratio by causing the regulator to adjust the degree of opening, based on a first temperature that is a temperature in the first ventilation path, a second temperature that is a temperature in the second ventilation path, and a third temperature that is a temperature in the third ventilation path.

<Technique 2>

The vehicle seat air conditioning device according to technique 1, wherein the controller adjusts the ratio based on x calculated according to:

$$x=(c-b)/(a-b) \quad \text{(Equation 1)}$$

where a is the first temperature, b is the second temperature, and c is the third temperature.

<Technique 3>

The vehicle seat air conditioning device according to technique 2, wherein when an absolute value of a difference between x and a target value is greater than or equal to a first threshold, the controller adjusts, based on temperature relationship information, the degree of opening to change by a first variation to cause x to become the target value, the temperature relationship information indicating a correlation between x and the degree of opening.

<Technique 4>

The vehicle seat air conditioning device according to technique 3, wherein in a case where the absolute value is less than the first threshold, when the absolute value is greater than or equal to a second threshold, the controller causes, based on the temperature relationship information, the regulator to change the degree of opening by a second variation to cause x to become the target value, the second variation being smaller than the first variation, and when the absolute value is less than the second threshold, the controller causes the regulator not to change the degree of opening.

<Technique 5>

The vehicle seat air conditioning device according to any one of techniques 2 to 4, wherein the controller obtains a detection result of a human presence sensor configured to detect whether the person is seated on the seat, the controller determines whether the person is seated on the seat based on x, and when the detection result and a determination result of whether the person is seated on the seat based on x do not match, the controller outputs information indicating that the detection result and the determination result do not match.

<Technique 6>

The vehicle seat air conditioning device according to any one of techniques 2 to 5, wherein the controller determines whether the person is seated on the seat based on x, when determining that the person is seated on the seat, the controller adjusts a rotational frequency of the blower to become a predetermined rotational frequency, and when determining that the person is not seated on the seat, the controller adjusts the rotational frequency of the blower to become a rotational frequency less than the predetermined rotational frequency.

<Technique 7>

The vehicle seat air conditioning device according to technique 5 or 6, wherein when x is greater than or equal to a third threshold, the controller determines that the person is not seated on the seat, and when x is less than the third threshold, the controller determines that the person is seated on the seat.

<Technique 8>

The vehicle seat air conditioning device according to any one of techniques 1 to 7, wherein the controller causes the blower based on the first temperature, the second temperature, and the third temperature to adjust a rotational frequency of the blower.

<Technique 9>

The vehicle seat air conditioning device according to any one of techniques 1 to 8, wherein the controller adjusts a rotational frequency of the blower based on output relationship information indicating a correlation between the rotational frequency of the blower and the degree of opening.

<Technique 10>

The vehicle seat air conditioning device according to any one of techniques 1 to 9, wherein a third temperature sensor that detects the third temperature is provided in the third ventilation path.

<Technique 11>

The vehicle seat air conditioning device according to any one of techniques 1 to 10, wherein a first temperature sensor that detects the first temperature is provided in the first ventilation path.

<Technique 12>

The vehicle seat air conditioning device according to any one of techniques 1 to 11, wherein the controller uses, as the first temperature, a temperature detected by a cabin temperature sensor that is disposed in a cabin of the vehicle and detects a temperature in the cabin.

<Technique 13>

The vehicle seat air conditioning device according to any one of techniques 1 to 12, wherein a second temperature sensor that detects the second temperature is provided in the second ventilation path.

<Technique 14>

The vehicle seat air conditioning device according to any one of techniques 1 to 13, wherein the controller uses, as the second temperature, air conditioning temperature information indicating a temperature of air blown out by vehicle air conditioning equipment disposed in the vehicle.

<Technique 15>

The vehicle seat air conditioning device according to technique 3 or 4, wherein the controller corrects the temperature relationship information based on the first temperature, the second temperature, and the third temperature in a state where the person is not seated on the seat or in a state where a predetermined person is seated on the seat.

<Technique 16>

The vehicle seat air conditioning device according to technique 9, wherein the controller corrects the output relationship information based on the first temperature, the second temperature, and the third temperature in a state where the person is not seated on the seat or in a state where a predetermined person is seated on the seat.

<Technique 17>

The vehicle seat air conditioning device according to technique 7, wherein the controller calculates x based on the first temperature, the second temperature, and the third temperature in a state where the person is not seated on the seat, and when x calculated is less than or equal to a fourth threshold that is lower than the third threshold, the controller causes a notifier to notify information indicating that the first air inlet is clogged.

<Technique 18>

The vehicle seat air conditioning device according to technique 7, wherein the controller calculates x based on the first temperature, the second temperature, and the third temperature in a state where the person is not seated on the seat, and when x calculated differs from the third threshold, the controller changes the third threshold to x calculated.

While various embodiments have been described herein above, it is to be appreciated that various changes in form and detail may be made without departing from the spirit and scope of the present disclosure as presently or hereafter claimed.

Further Information About Technical Background to this Application

The disclosures of the following patent applications including specification, drawings, and claims are incorporated herein by reference in their entirety: Japanese Patent Application No. 2022-031508 filed on Mar. 2, 2022, Japanese Patent Application No. 2022-156381 filed on Sep. 29, 2022, and PCT International Application No. PCT/JP2023/004858 filed on Feb. 13, 2023.

INDUSTRIAL APPLICABILITY

The present disclosure is applicable to, for example, a device that controls air conditioning for a person seated on a seat disposed in a vehicle.

The invention claimed is:

1. A vehicle seat air conditioning device disposed in a vehicle and used for a seat including a seat back and a seat cushion, the vehicle seat air conditioning device comprising:

a blower embedded in the seat;

a first ventilation path through which air drawn in by the blower passes from a first air inlet provided on a surface of the seat that is located on a face of the seat on which a person is seated;

a second ventilation path through which air drawn in by the blower passes from a second air inlet that is an air inlet different from the first air inlet and provided at a location in the seat other than the surface of the seat;

a third ventilation path through which air directed from at least one of the first ventilation path or the second ventilation path is directed to an air outlet provided on a surface of the seat back that is a surface located on the face of the seat on which the person is seated;

a regulator that adjusts a ratio between a flow rate of air directed from the first ventilation path to the third ventilation path and a flow rate of air directed from the second ventilation path to the third ventilation path by adjusting a degree of opening of each of a first connection port and a second connection port, the first connection port connecting the first ventilation path and the third ventilation path, the second connection port connecting the second ventilation path and the third ventilation path; and a controller that controls the blower and the regulator, wherein the controller adjusts the ratio by causing the regulator to adjust the degree of opening of each of the first connection port and the second connection port, based on a first temperature that is a temperature in the first ventilation path, a second temperature that is a temperature in the second ventilation path, and a third temperature that is a temperature in the third ventilation path.

2. The vehicle seat air conditioning device according to claim 1, wherein the controller adjusts the ratio based on x calculated according to:

$$x=(c-b)/(a-b) \qquad \text{(Equation 1)}$$

where a is the first temperature, b is the second temperature, and c is the third temperature.

3. The vehicle seat air conditioning device according to claim 2, wherein when an absolute value of a difference between x and a target value is greater than or equal to a first threshold, the controller adjusts, based on temperature relationship information, the degree of opening of each of the first connection port and the second connection port to change by a first variation to cause x to become the target value, the temperature relationship information indicating a correlation between x and the degree of opening of each of the first connection port and the second connection port.

4. The vehicle seat air conditioning device according to claim 3, wherein in a case where the absolute value is less than the first threshold, when the absolute value is greater than or equal to a second threshold, the controller causes, based on the temperature relationship information, the regulator to change the degree of opening of each of the first connection port and the second connection port by a second variation to cause x to become the target value, the second variation being smaller than the first variation, and when the absolute value is less than the second threshold, the controller causes the regulator not to change the degree of opening of each of the first connection port and the second connection port.

5. The vehicle seat air conditioning device according to claim 3, wherein the controller corrects the temperature relationship information based on the first temperature, the second temperature, and the third temperature in a state where the person is not seated on the seat or in a state where a predetermined person is seated on the seat.

6. The vehicle seat air conditioning device according to claim 2, wherein the controller obtains a detection result of a human presence sensor configured to detect whether the person is seated on the seat, the controller determines whether the person is seated on the seat based on x, and when the detection result and a determination result of whether the person is seated on the seat based on x do not match, the controller outputs information indicating that the detection result and the determination result do not match.

7. The vehicle seat air conditioning device according to claim 6, wherein when x is greater than or equal to a first threshold, the controller determines that the person is not seated on the seat, and when x is less than the first threshold, the controller determines that the person is seated on the seat.

8. The vehicle seat air conditioning device according to claim 7, wherein the controller calculates x based on the first temperature, the second temperature, and the third temperature in a state where the person is not seated on the seat, and when x calculated is less than or equal to a second threshold that is lower than the first threshold, the controller causes notification equipment to notify information indicating that the seat is clogged.

9. The vehicle seat air conditioning device according to claim 7, wherein the controller calculates x based on the first temperature, the second temperature, and the third temperature in a state where the person is not seated on the seat, and when x calculated differs from the first threshold, the controller changes the first threshold to x calculated.

10. The vehicle seat air conditioning device according to claim 2, wherein the controller determines whether the person is seated on the seat based on x, when determining that the person is seated on the seat, the controller adjusts a rotational frequency of the blower to become a predetermined rotational frequency, and when determining that the person is not seated on the seat, the controller adjusts the rotational frequency of the blower to become a rotational frequency less than the predetermined rotational frequency.

11. The vehicle seat air conditioning device according to claim 1, wherein the controller causes the blower based on the first temperature, the second temperature, and the third temperature to adjust a rotational frequency of the blower.

12. The vehicle seat air conditioning device according to claim 1, wherein the controller adjusts a rotational frequency of the blower based on output relationship information indicating a correlation between the rotational frequency of the blower and the degree of opening of each of the first connection port and the second connection port.

13. The vehicle seat air conditioning device according to claim 12, wherein the controller corrects the output relationship information based on the first temperature, the second temperature, and the third temperature in a state where the person is not seated on the seat or in a state where a predetermined person is seated on the seat.

14. The vehicle seat air conditioning device according to claim 1, wherein a temperature sensor that detects the third temperature is provided in the third ventilation path.

15. The vehicle seat air conditioning device according to claim 1, wherein a temperature sensor that detects the first temperature is provided in the first ventilation path.

16. The vehicle seat air conditioning device according to claim 1, wherein the controller uses, as the first temperature, a temperature detected by a cabin temperature sensor that is disposed in a cabin of the vehicle and detects a temperature in the cabin.

17. The vehicle seat air conditioning device according to claim 1, wherein a temperature sensor that detects the second temperature is provided in the second ventilation path.

18. The vehicle seat air conditioning device according to claim 1, wherein the controller uses, as the second temperature, air conditioning temperature information indicating a temperature of air blown out by vehicle air conditioning equipment disposed in the vehicle.

* * * * *